US009182755B2

(12) United States Patent
Bliss et al.

(10) Patent No.: US 9,182,755 B2
(45) Date of Patent: Nov. 10, 2015

(54) AUTOMATED OPERATOR INTERFACE GENERATION IN A CONTROL SYSTEM

(75) Inventors: Ronald Bliss, Twinsburg, OH (US); Gordon Daily, Solon, OH (US); David R. Killian, North Royalton, OH (US); Keith M. Hogan, Painesville, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 563 days.

(21) Appl. No.: 12/869,524

(22) Filed: Aug. 26, 2010

(65) Prior Publication Data
US 2012/0054650 A1 Mar. 1, 2012

(51) Int. Cl.
G05B 19/042 (2006.01)
G06F 9/44 (2006.01)

(52) U.S. Cl.
CPC .... *G05B 19/042* (2013.01); *G05B 2219/23008* (2013.01); *G05B 2219/32128* (2013.01); *G06F 9/4443* (2013.01)

(58) Field of Classification Search
CPC .................................................. G05B 19/042
USPC ......................................... 715/762, 744, 810
See application file for complete search history.

(56) References Cited

U.S. PATENT DOCUMENTS

| 6,446,076 | B1 | 9/2002 | Burkey et al. |
| 6,791,581 | B2 * | 9/2004 | Novak et al. ................. 715/744 |
| 7,721,273 | B1 | 5/2010 | Hall et al. |
| 7,835,805 | B2 | 11/2010 | Hood et al. |
| 7,856,279 | B2 | 12/2010 | Hood et al. |
| 7,912,560 | B2 | 3/2011 | Hood et al. |
| 2002/0103817 | A1 | 8/2002 | Novak et al. |

(Continued)

FOREIGN PATENT DOCUMENTS

CN 1950767 A 4/2007
CN 102073448 A 5/2011
(Continued)

OTHER PUBLICATIONS

European Search Report for European Patent Application No. EP11179086 dated Jul. 30, 2013, 9 pages.
(Continued)

*Primary Examiner* — Andrey Belousov
(74) *Attorney, Agent, or Firm* — Amin, Turocy & Watson, LLP

(57) ABSTRACT

System(s), device(s), and method(s) provide automated configuration of operator interface(s) in an industrial control system, the automated configuration is based at least on control logic that regulates a process and associated equipment in an industrial environment. A terminal that renders control data can acquire the control logic and associate a set of control data structures therein to one or more display objects, which can be retained in a set of libraries stored in the terminal. Based at least on the association, the terminal automatically generates a rendering project that can render an operator interface that conveys control data according to the control logic. A mapping enables association amongst a control data structure and a display object; the mapping can include relationships amongst display objects for numerous domains of industrial control. The operator interface can be refined autonomously or through external data received at the terminal and associated with predetermined event(s).

25 Claims, 14 Drawing Sheets

(56) References Cited

U.S. PATENT DOCUMENTS

| | | | |
|---|---|---|---|
| 2003/0184585 A1* | 10/2003 | Lin et al. | 345/763 |
| 2004/0201603 A1* | 10/2004 | Kalish | 345/700 |
| 2004/0210825 A1* | 10/2004 | Novak et al. | 715/500.1 |
| 2005/0044504 A1* | 2/2005 | Fernandez et al. | 715/762 |
| 2006/0288301 A1* | 12/2006 | Hood et al. | 715/762 |
| 2007/0079355 A1 | 4/2007 | Chand et al. | |
| 2007/0109580 A1 | 5/2007 | Yoshida | |
| 2008/0092057 A1* | 4/2008 | Monson et al. | 715/744 |
| 2008/0147207 A1 | 6/2008 | D'Mura et al. | |
| 2008/0188956 A1 | 8/2008 | Hood et al. | |
| 2009/0248741 A1 | 10/2009 | Singh et al. | |
| 2010/0077350 A1* | 3/2010 | Lim et al. | 715/810 |
| 2010/0082123 A1 | 4/2010 | Plache et al. | |
| 2013/0006395 A1 | 1/2013 | Plache et al. | |

FOREIGN PATENT DOCUMENTS

| | | | |
|---|---|---|---|
| CN | 102089786 A | 6/2011 | |
| EP | 0691604 A2 | 1/1996 | |

OTHER PUBLICATIONS

National Instruments Corporation, "LabView: User Manual," Jul. 2000 Edition, Part No. 320999C001, 272 pages.
Office Action for U.S. Appl. No. 13/171,114, dated Oct. 28, 2013, 10 pages.
Notice of Allowance for U.S. Appl. No. 13/171,114, dated Mar. 21, 2014, 12 pages.
Chinese Office Action dated Sep. 3, 2014 for Chinese Application Serial No. 201210224455.2, 11 pages.
European Office Action dated Dec. 2, 2014 for European Application Serial No. 11179086.1, 7 pages.
Butler, et al. "Device independence and the Web" IEEE Internet Computing, Sep. 1, 2002, IEEE Service Center, New York, NY.—Institute of Electrical and Electronics Engineers, US—ISSN 1089-7801, 6 pages.

* cited by examiner

AUTOMATED OPERATOR INTERFACE GENERATION IN A CONTROL SYSTEM

TECHNICAL STATEMENT

The subject disclosure relates to automation control, and more specifically, to automated configuration of operator interface(s) in an industrial control system, the automated configuration is based at least on control logic.

BACKGROUND

Industrial control systems regulate operation of equipment in an industrial environment, where operation of the equipment includes process(es) typically directed to accomplishment of a complex task or a streamlined, automated task, such as large scale manufacturing. Regulation of operation of the equipment and related process(es) typically exploits and produce substantive amounts of control data, which include configuration data such as controller code, human-machine interface (HMI) data, process recipe(s) and report definitions, or the like. In addition, operation of industrial control systems also produces both real-time and historical data about the status of regulated equipment and related process(es), the data including alarms, process values, and audit/error logs. To operate industrial control systems, various HMIs in the industrial environment render control data (real-time (or last known) and historical data) through operator interfaces which convey process overviews or equipment detail. Multiple operator interfaces are created to provide rich information related to the various control processes implemented in the industrial control system so that the operator can switch between them to monitor various aspects of the equipment and related process(es) under control. Various factors contribute to the time and human resources necessary to configure operator interface(s) employed to render control data in an industrial environment; such factors include complexity of the equipment and related process(es) that are regulated through one or more controllers, amount of control data collected as part of controlling the equipment and the related process(es), and security protocols and associated data necessary to ensure operational integrity of the equipment. Yet, in conventional industrial control systems, development of an operator interface to consume control data through a dedicated human-machine interface (HMI) is a highly manual process that generally occurs after control design or equipment configuration and contributes significantly to the development cost.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

One or more embodiments in the subject disclosure provide automated configuration of operator interface(s) in an industrial control system. The automated configuration is based at least on control logic that regulates a process and associated equipment in an industrial environment. A terminal that renders control data can acquire the control logic and associate a set of control data structures therein to one or more display objects, which can be retained in a set of libraries stored in the terminal. Based at least on the association, the terminal automatically generates a rendering project that can render an operator interface that conveys control data according to the control logic. A predetermined mapping enables association amongst a control data structure and a display object; the mapping can include relationships amongst display objects for numerous domains of industrial control. The operator interface can be refined autonomously or through external data received at the terminal.

By leveraging control data structures available to represent control logic, the one or more embodiments of the subject disclosure provide various efficiencies with respect to conventional control systems: In particular, though not exclusively, visualization development is simplified and likelihood of error due to human intervention is significantly mitigated; costs associated with visualization development can be reduced substantially. It should be appreciated that while various aspects or features of the subject disclosure are described in connection with a terminal (e.g., a workstation, a desktop computer, a mobile computer, a smartphone) that embodies a human-machine interface (HMI) and can render control data, such aspects or features described herein also can be implemented or accomplished in control systems in which dedicated human-machine interfaces (HMIs) are employed to render control data. In addition, certain embodiments in the subject disclosure enable implementation of various aspects or features in legacy HMIs or HMIs of limited complexity.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
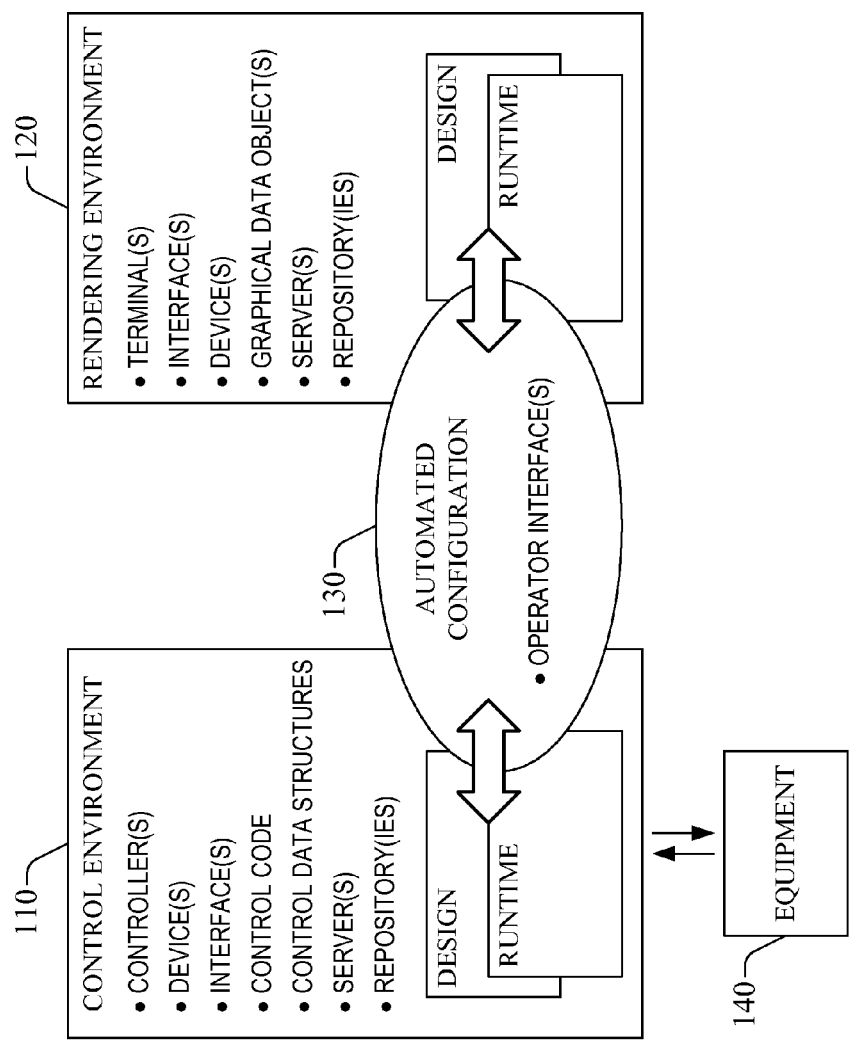
FIG. 1 is a diagram that illustrates automatic generation of operator interface(s) in a control system in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a diagram that illustrates automatic generation of operator interface(s) in a control system in accordance with aspects described herein. The control system includes a control environment 110 and a rendering environment 120 coupled through an automated configuration block 130. To effect such coupling, automated configuration block 130 can be distributed amongst control environment 110 and rendering environment 120; automated configuration block can include component(s) in design or runtime in control environment 110, and component(s) in design or runtime in rendering environment 120. The control environment 110 is functionally coupled to equipment 140 and associated process(es) (industrial process(es), manufacturing process(es), measurement process(es) in a laboratory, infrastructure development process(es), such as oil and gas prospecting and extraction, etc.). Equipment 140 generally is specific to a production process and related market space(s) (e.g., beverages, edible goods, textile goods, oil and gas . . . ) and can include one or more sets of tools, a group of machines, numerous systems and related sub-systems, real estate and associated infrastructure, and so forth. Control environment 110 comprises controller(s), device(s), interface(s), machine-executable control code (also referred to as control code), control data structures, server(s), repository(ies), or the like, whereas rendering environment 120 comprises terminal(s), device(s), interface(s), graphical data object(s), server(s), repository(ies), or the like. A controller in control environment 110 can be embodied in one of a programmable automation controller (PAC), which can be a dedicated programmable logic controller (PLC); a PC-based controller; or the like. Control code and control data structures in the control environment 110 represent control logic that administers equipment 140, and related processes, functionally coupled to the control environment 110. In an aspect, control environment 110 is an industrial automation control environment and the control logic is automation control logic. Control environment 110 includes a design environment in which control logic is developed and a runtime environment in which the control logic is implemented (e.g., executed). In the design environment, in an aspect, instruction(s), data type(s), and metadata tag(s) that comprise control code are produced and retained as part of configuration, or composition, of a control project. Likewise, rendering environment 120 includes a design environment and a runtime environment; the design environment enables generation of operator interfaces than can render information associated with the entities or processes regulated via the control environment 110.

Based on control logic in the control environment 110, automated configuration block 130 automatically (e.g., without manual intervention) provisions one or more operator interfaces in the rendering environment 120. Automatic provisioning can be effected in response to a predetermined event or input (e.g., data) received from an operator. The one or more operator interfaces enable, at least in part, rendering of information associated with equipment 140 and associated process(es) regulated through the control logic, e.g., automation control logic. To provision an operator interface, automated configuration block 130 extracts at least a portion of a control data structure associated with control code that represents control logic, and associates at least the portion of the control data structure to one or more graphical data objects. The one or more graphical data objects can be included in a rendering project that, when implemented, produces the operator interface. Such association amongst a control data structure, or a portion thereof, with a graphical display object also can be effected with any or most any rendering content other than the graphical data object—for instance, the control data structure can be associated with a gesture data object. Implementation of the rendering project can be accomplished through execution of the rendering project. It should be appreciated that the automated configuration block 130 can associate a control data structure, or a portion thereof, to a graphical data object for each instance of the control data structure in control code that represents control logic, e.g., automation control logic. In an aspect, for example, a graphical data object can include (e.g., via encapsulation) an icon, an animated image, a sound file or other aural indicia, a screen or display, a faceplate, a navigation panel, or the like.

In an aspect of the subject disclosure, automated configuration block 130 can supply an operator interface in response to generation of control logic or modification of extant control logic. In another aspect, automated configuration block 130 can provide an operator interface in response to occurrence of a predetermined event; for instance, a predetermined event can be elapsing a timer, attaining a specific time in a schedule; configuring equipment 140, repairing or maintaining equipment 140; or repairing or maintaining one or more of a controller in control environment 110, a device in control environment 110, or an interface in control environment 110. In an illustrative scenario, if maintenance is effected in the control environment or in equipment regulated therefrom, the automated configuration block can produce one or more operator interfaces that are based on extant control logic and specific maintenance or repairs that are performed.

Automated configuration block 130 can couple control environment 110 and rendering environment 120 in accordance with various scenarios. The coupling can be homogeneous, wherein automation configuration block 130 couples (a) design in control environment 110 and design in rendering environment 120 or (b) runtime in control environment 110 to runtime in rendering environment 120. The coupling also can be heterogeneous, wherein automation configuration block 130 couples (A) runtime in control environment 110 and design in rendering environment 120 or (B) design in control environment 110 and runtime in rendering environment 120. Based on the coupling, a bottom-up environment for development of control environment 110 and rendering environment 120 is afforded by the automated configuration block 130 as described herein: As control environment 110 is developed—e.g., one or more controllers are installed, device(s) such as sensors are deployed, or control code is generated or updated—the rendering environment 120 can be developed either separately and then adjusted to suit the control environment 110 or in response to development of the control environment 110 at design or runtime.

In contrast to conventional systems, automated configuration block 130 can provision the one or more operator interfaces without manual intervention and irrespective of complexity of the control logic. Accordingly, at least one advantage of the subject disclosure is reduction of time and cost of development of operator interface(s) for specific control logic, e.g., automation control logic.

Figure 2:
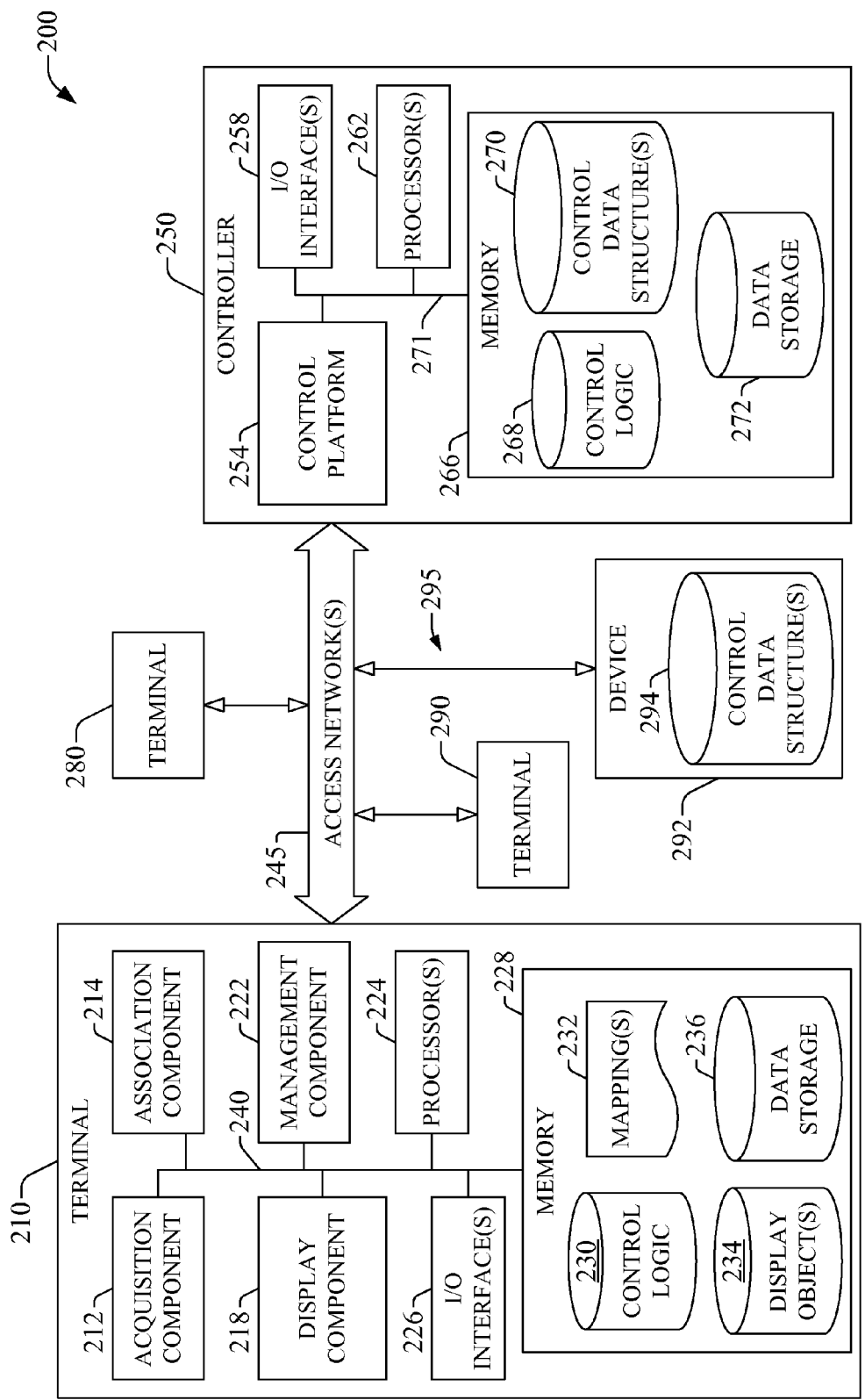
FIG. 2 illustrates an example system that enables and exploits automated generation of an operator interface in a control system in accordance with aspects disclosed herein.

FIG. 2 illustrates an example system 200 that enables and exploits automated generation of operator interface(s) in a control system in accordance with aspects disclosed herein. Example system 200 embodies an example control system. Terminal 210 can be part of a rendering environment (e.g., 120) within the control system and includes a set of components that enable, at least in part, the functionality of automated configuration block 130 described supra. In example system 200, terminal 210 is functionally coupled (e.g., communicatively coupled) to a controller 250 via access network(s) 245. Terminal 210 also can be functionally coupled (e.g., communicatively coupled) with a server (not shown) that is part of a platform (factory, plant, oil rig, etc.) that includes the control system. In an aspect, access network(s) 245 can be geographically distributed and can include one or more of a wireline network or a wireless network that operate in accordance with one or more protocols—for example, packet-based protocols such as internet protocol (IP), transmission control protocol (TCP), Ethernet, Ethernet TCP/IP, Control and Information Protocol (CIP) also referred to as Ethernet/IP, X.25, Asynchronous Transfer Mode (ATM) protocol, frame-based protocols such as frame relay, and circuit-switched protocols) include service network(s) and control network(s).

Service network(s) can comprise network(s) for communication of data that includes various data structures related to management data, graphic data, or control data, control logic, or metadata related to one or more variables. In an aspect, metadata can be part of control data structures, for example. In another aspect, metadata also can be included within a rendering project to dictate, at least in part, various features of an operator interface that is rendered in response to execution of the rendering project. As an example, metadata in a rendering project can dictate location or placement of a specific graphical data object. As another example, metadata also can dictate usage or selection of graphical data objects based on visualization requirements of or visualization resources available to a terminal (e.g., 210) that renders an operator interface through execution of a rendering project that includes such metadata. As yet another example, metadata in a rendering project also can dictate, at least in part, usage of a graphical data object based on a security clearance or security configuration of terminal that renders an operator interface through execution of the rendering project.

Control network(s) primarily administer control data and data transactions related to a control environment (e.g., 210). Distinction amongst service network(s) and control network(s) can enable improved integration of various functional elements within the control environment: For example, different parts of the control environment can be linked through custom or legacy control network(s), while exchange of information amongst the control environment and other network elements, such as a server in an enterprise network (e.g., back-end system), can be implemented through non-proprietary service network(s), such as an Ethernet network. It should be appreciated that in one or more embodiments, the service network(s) and the control network(s) are both embodied in the same physical network.

Figure 3:
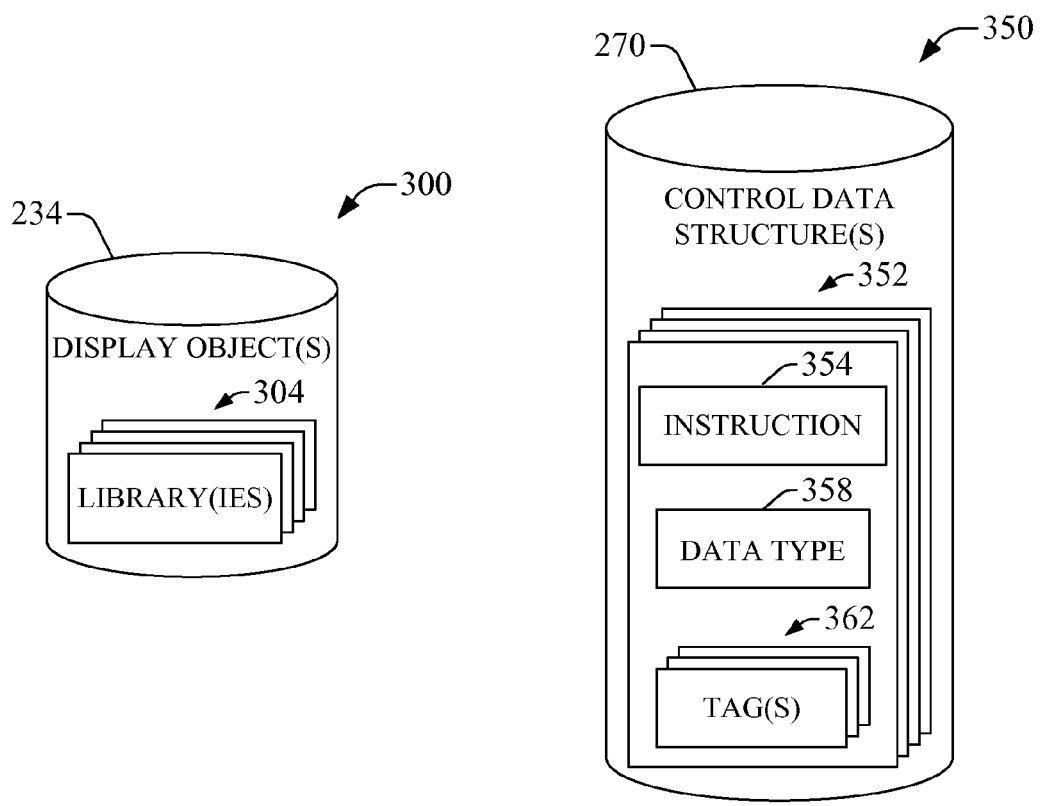
FIG. 3 represents example structure of display object storage and control data structure storage in accordance with aspects described herein.

Controller 250 is part of a control environment (e.g., 110) within the control system, and includes a control platform 254 that enables the controller 250 to regulate equipment (e.g., 140) and associated process(es) in accordance with control code retained in control logic storage 268, also referred to as control logic 264. Control data related to regulation of the associated process(es) can be retained in data storage 272; other data also can be retained in data storage 272. The control code is based on one or more control data structures that are part of a set of control data structures available to program the controller 250. The set of control data structures is extensible and specific to controlled equipment and related process(es). In an aspect, a control data structure comprises a control instruction, a data type, and a memory tag. In an aspect, a memory tag, or tag, is a composite data structure that includes (a) metadata (e.g., tag metadata) that defines the data related to the memory tag and (b) a data value(s). Control data structure(s) storage 270 retains control data structure(s). The control instruction can be an add-on instruction, which is defined for a specific control action. In addition or in the alternative, the control instruction can be predefined control instruction that is part of a control program product, wherein the control program product can be provisioned when the controller 250 is manufactured. The data type includes at least one of various common types employed in control systems, such as numerical data (real data, integer data, complex data, etc.) and logical data, character data, in addition to user defined data types such as array (vectors, matrices, etc.) data types or composite data types, e.g., a data type with a logical variable and an array data type. The memory tag characterizes the instruction and related data type of control data that is bound to a control screen or graphical display object(s) therein. As an example, for a control instruction related to temperature regulation, tag metadata (not shown) can convey a temperature value or a range of temperature values (e.g., minimum, maximum), or specific engineering units (e.g., Kelvin (K), degree Celsius (° C.), or degree Fahrenheit (° F.)). The set of control data structures is stored in a control data structure(s) storage 270 within memory 266. As illustrated in diagram 350 in FIG. 3, memory element 270 retains one or more data control data structures 352, each comprising an instruction 354, a data type 358, and memory tag(s) 362 (also referred to as tag(s) 362). As indicated supra, memory tag(s) include metadata (e.g., tag metadata) associated with a control data structure or a portion thereof. Through storage of such metadata (e.g., tag metadata) in a controller, duplication of visualization settings or control settings is largely reduced when compared to conventional control systems that retain such metadata in an HMI.

Controller 250 also includes input/output (I/O) interface(s) 258 that enable generation of the control code. I/O interface(s) 258 also allows communication amongst the controller 250 and terminal 210 and the controller 250 and device(s), such as sensor(s) (not shown); such communication effected in part through access network(s) 245. In an aspect, at least one I/O interface of I/O interface(s) 258 is associated with a group of I/O module(s) that can be retained in memory 266 as one or more sets of computer-executable code instructions (not shown). The group of I/O module(s) enables the at least one I/O interface, and thus controller 250, to communicate and control I/O functionality (which can be defined in the group of I/O modules). In certain embodiments, the group of I/O modules is configured after or substantially upon controller 250 is configured (e.g., programmed) to communicate and control I/O functions. Data structure(s) that define, at least in part, an I/O module can be exploited to produce at least a portion of an operator interface in a manner similar to that described hereinafter in connection with generation of an operator interface based on control data structure(s). At least the portion of the operator interface can convey a representation (e.g., visual representation or aural representation) of device(s), equipment, interface(s), that enable I/O functionality in a control environment that includes or is functionally coupled to controller 250

In addition, controller 250 includes processor(s) 262, memory 266, and other circuitry that enables implementation of control process(es) (e.g., execution of control logic, or control code instructions) related to a specific equipment (e.g., 140). In one or more embodiments of the subject disclosure, controller 250 is an industrial controller or an industrial automation controller. Generally, industrial controllers or industrial automation controllers are purpose-specific processing devices employed to regulate automated or semi-automated entities such as industrial processes, machines, manufacturing equipment, plants, or the like. A typical industrial controller or automation controller executes, through a processor(s) 262, for example, control logic to measure one or more variables or inputs representative of a status of a controlled entity, or effectuate outputs associated with control of the entity. Such inputs and outputs can be digital or analog; inputs and outputs are not shown in FIG. 2 for the sake of simplicity.

In example system 200, terminal 210 includes an acquisition component 212 that extracts a set of control data structures in control code retained in the controller 250. As described supra, the control code embodies specific control logic, e.g., automation control logic, that the controller 250 can execute to regulate equipment (e.g. 140) and associated process(es). Acquisition component 212 can retain a local copy of the set of control data structures in control logic storage 230, also referred to as control logic 230; the local copy can be accessed by association component 214 which can link one or more instances of each control data structure in the set of control data structures to a graphical display object to generate, at least in part, a rendering project (not shown) based on the control logic represented by the control code that encompasses the set of control data structures. One or more display objects are retained in display object(s) storage 234; in an aspect, as illustrated in diagram 300 in FIG. 3, the one or more display objects can be grouped and stored in a set of one or more libraries 304. In an aspect, management component 222 can administer the set of one or more libraries 304: For instance, management component 222 can retrieve a current version of a library from a server (not shown), which can be part of a back-end platform in the control system that includes, and utilizes, terminal 210. In alternative or additional embodiments, the set of one or more libraries 304 can be retained in a dedicated memory element (register, table, database, file, etc.; not shown) within memory 228 rather than as part of display object(s) 234; in an aspect, the dedicated memory element can be an application project file that is part of a library file.

Association component 214 links an instance of a control data structure in the set of control data structures to a display object (or graphical data object) in accordance with at least a first mapping; the linkage or association selects the display object based on the control data structure. In addition or in the alternative, based on at least a second mapping, association component 214 can link an instance of a data structure that defines an I/O module (not shown) in controller 250 to a display object. Moreover or as another alternative, based at least on a third mapping, association component 214 can link an instance of a control data structure within control logic to a graphical data object based on the location (e.g., a logical block such as a subroutine, a program module, etc.) of the instance of the control data structure within the control logic. In an aspect, the first mapping, the second mapping, or the third mapping can be included as part of an HMI design or an HMI runtime product; at least the first mapping or the second mapping can be defined by the HMI vendor or by an end-user (control designer, operator, etc.). Association component 214 can record the display object in memory 228, e.g., as part of mapping(s) storage 232, and can create a collection of display objects based in part on the control logic acquired from controller 250. Such collection can be retained in memory 228 as part of display object(s) storage 234.

In an aspect, a mapping described herein can be generated one time (e.g., at a time terminal 210 is manufactured or provisioned) and it can be utilized at runtime (control runtime, rendering runtime, or both) to create a variety of collections of display objects based on control logic, as describe hereinbefore; the mapping can be retained in mapping(s) storage 232 within memory 228. In certain embodiments, management component 222 can administer mappings available to terminal 210. As indicate above, a control data structure can be defined by at least one of a control instruction, a data type, and a memory tag. In an aspect, the mapping associates a display object (e.g., an icon, an animated image, a screen or display, a faceplate, navigation panel) to the control instruction. In another aspect, the mapping associates a display object to the data type. In yet another aspect, the mapping associates a display object to the memory tag. To increase robustness and improve plug-and-play performance, e.g., in response to deployment of a terminal or addition of a sensor to a control environment, a mapping stored in a terminal (e.g., 210) can include relationships amongst set(s) of display objects and set(s) of control data structures for numerous control domains (e.g., manufacturing, packaging, testing) or markets (food and beverage, pharmaceutical, vehicular, oil and gas, mineral, electric, telecommunications, etc.).

An available collection of display objects for a specific control logic in a controller (e.g., controller 250) can be acquired (received, retrieved, etc.) by display component 218, wherein the display component 218 can generate a rendering project based at least on such collection. Display component 218 can execute the rendering project to produce an operator interface; in an illustrative aspect, display component 218 can exploit processor(s) 224 to execute the rendering project. The operator interface so generated is thus based at least on the control logic executed by controller 250. In addition, display component 218 can enable data entry from an end-user (e.g., an HMI designer, a control engineer or operator); for example, display component 218 can receive data input through various user-interface interaction modalities (speech gestures, motion gestures, touch gestures, etc.) and conduits, for example, keyboards, keypads, touch screens, microphones, cameras, or the like. In addition, display component 218 can create the rendering project at control runtime, when a control project is executed, and in response to alterations performed to the control project at control runtime. Accordingly, in an aspect, an end-user (e.g., an HMI designer, a control engineer or operator) can be presented with an alternative or additional operator interface to incorporate changes performed to a control project at control runtime. For instance, such alternative or additional operator interface can include a rendition of data trend(s) (e.g., a set of data values within a predetermined time scale and a specific update rate; an abridged rendition of specific data sets (e.g., groups of values of predetermined (e.g., autonomously selected) variables; or customized screen content comprising pre-configured display objects. In contrast, conventional HMIs or terminals that render control data in conventional control systems remain static, or unchanged, during control runtime. Thus, the conventional HMIs or terminals generally force the end-user to utilize a separate computer or apparatus to collect a current configuration, if such configuration is not available, make changes to a rendering project, and redeploy the rendering project. It should be appreciated that such end-user intervention can be a tedious endeavor to manage since "as running" or locally stored data cannot or should not be lost through this closed-loop (collect-modify-deploy) modification process in order for the modification process to be effective or successful.

One or more operator interfaces generated as described herein enable terminal 210 to render control data associated with various control processes regulated through controller 250 based on specific control code. The display component 218 in terminal 210 can render the one or more operator interfaces through visual or aural indicia. The one or more operator interfaces can be associated with one or more sets of control screens, and rendered in accordance with at least one of graphical display object(s) or gesture rendering object(s) that compose the control screen(s) in the one or more sets of control screens. Various schemes can be employed to render the one or more operator interface(s) or other content(s) such as window-based schemes, e.g., iconic representation, pop-up representation of indicia; or text-based representation, with scroll-down or scroll-sideways delivery, or static rendering. In addition, the one or more operator interfaces or other content(s) can be organized in various configurations within a rendering area (e.g., display screen) that can be a part of display component 218.

In addition to features described supra, management component 222 also enables requesting scanning of a control layer, either runtime environment or design environment based at least on asynchronous data received by terminal 210. In a scenario, such data can originate from an operator that consumed control data via terminal 210. In another scenario, such data can originate from a controller, such as controller 250, and can be part of payload data in an indication (e.g., an instruction, a data packet, a light-payload file (e.g., a cookie), an email communication, an instant message, a set of bits . . . ) that control logic in the controller has changed or a change in state condition has occurred; changes in state condition can include attachment of a sensor to the controller, malfunction of a sensor attached to the controller or equipment regulated through the controller, departure from target key performance indicator(s) in process(es) regulated by the controller, or the like.

A management component 222 in terminal 210 can receive and convey data and signaling to support automated generation of an operator interface as disclosed herein. In an aspect, management component 222 can retrieve a set of display objects from a server (not shown) to enable automatic generation of a rendering project based on control code (e.g., control data structure(s)) extracted from a controller (e.g., 250). In an illustrative scenario, an acquisition component 212 in terminal 210 can deliver a request to download the set of display objects to management component 222; the request can be delivered after a determination is made that display object(s) store 234 does not contain one or more elements necessary to be produce an operator interface based on the control code acquired from a controller. The illustrative scenario can occur when control logic in the controller is updated (e.g., the controller replaces an older controller, or new control code is supplied to the controller) or the terminal 210 is installed in a new location in which it can be beneficial to render an extant operator interface in a specific natural language. The new location can be conveyed by a logical address (e.g., an internet protocol (IP) address, or a URL (Universal Resource Locator)) assigned to one or more controllers operationally coupled to the terminal 210. In another aspect, management component 222 can retrieve a group of control data structures, or portion(s) thereof, from a controller (e.g., 250) and supply at least a part of the group to display component 218 for rendering. Moreover, management component 222 can collect metadata associated with a control data structure from the controller 250. Moreover, management component 222 can receive data that directs management component 222 to query a controller (e.g., 250) for specific control data structure(s) or control code. In response to a query, management component 222 can receive relevant data from the controller and convey such data to display component 218 for rendering. Such functionality of management component 222 can be exploited at runtime (control runtime or rendering runtime, or both), which improves operator ability to locate particular information in a control environment with respect to conventional control systems. In addition, the described functionality of management component 222 increases operator efficiency and thus can reduce costs and error.

In terminal 210, at least a portion of I/O interface(s) 226 enables functional coupling, e.g., communicative coupling, of terminal 210 with access network(s) 245; the functional coupling allows communication (e.g., exchange of data and signaling) of terminal 210 with other controller(s) (e.g., controller 250); other terminal(s) such as terminal 280 and terminal 290; device(s), such as device 292; and server(s) (not shown). In an aspect, device 292 is functionally coupled to access network 245 via interface(s) 295, and includes at least one control data structure retained in memory element 294. In addition to control data structure(s) 294, device 292 also includes data storage (not shown). In an embodiment, device 292 can be an intelligent device, such as a variable speed drive for a motor or an intelligent valve. In another embodiment, device 292 can be an I/O device, such as various sensors, a scanner, a key pad, a touch pad, or the like. In one or more embodiments, device 292 can include at least one data structure, other than a control data structure, that can be exploited to automatically generate an operator interface in accordance with aspects described herein. Device 292 can be part of equipment 140.

The portion of I/O interface(s) 226 that enables communication of terminal 210 with other terminal(s), controller(s), or server(s) via access network(s) 245 can include network adaptor(s), port(s), reference link(s), or the like. I/O interface(s) 226 also can functionally couple (e.g., communicatively couple) the terminal 210 with peripheral devices (e.g., device 292) and with an electric grid that can supply power for operation of the terminal 210. To at least that end, I/O interface(s) 226 can include a set of connectors and suitable circuitry (transformers, power amplifiers, etc.).

In an aspect, I/O interface(s) 226 can be distributed and deployed in part within display component 218 to enable acquisition of data in response to conveyance of control data through one or more operator interfaces. The portion of I/O interface(s) 226 that is part of display component can be embodied in data entry components, e.g., keypad, touch detection components, and related circuitry that enables functional coupling of the portion of I/O interface(s) 226 with one or more components or functional elements (e.g., processor(s), memory, bus) of terminal 210.

In example system 200, terminal 210 also includes processor(s) 224, which can be configured to execute or can execute computer-executable code instructions (not shown) stored in memory 228 to implement or provide at least part of the described functionality of terminal 210. Such computer-executable code instructions can include program modules or software or firmware applications that implement specific tasks which can be accomplished, for example, through one or more of the methods described in the subject specification and that are associated, at least in part, with functionality or operation of example system 200. Moreover, in one or more embodiments, acquisition component 212, association component 214, and one or more components in display component 218 or functionally coupled thereto can be can be implemented as software or firmware that can be retained in memory 228 as one or more sets of computer-executable code instructions that, when executed by processor(s) 228, implement such components and their associated functionality as described herein in various aspects. To provide such functionality, in one aspect, processor(s) 224 can exploit bus 240 to exchange data or any other information amongst functional elements within terminal 210 and memory 228 or elements therein. Bus 240 can be embodied in at least one of a memory bus, a system bus, an address bus, a message bus, or any other conduit, protocol, or mechanism for data or information exchange among components that execute a process or are part of execution of a process. Bus 240 also can include a power bus. The exchanged information can include at least one of computer-executable code instruction(s), computer-executable code structure(s), data structures, or the like.

Memory 228 also can retain data resource(s) retrieved or received at least from controller 250 or other controller(s) (not shown); data storage 236 can contain such data resource(s). Data resources comprise files; control screens;

control projects; instructions; data structures, such as graphical data objects and control data objects; memory tags; memory addresses; or the like. In addition to, or as part of, stored data resources, memory 228 also can retain state information (e.g., alarm condition(s)) associated to a terminal, a controller, a device, or other equipment. In an aspect, memory 228 can include various graphical data objects or gesture data objects in display object(s) storage 234. Graphical data objects or gesture data objects define a display object; gesture data objects can define display objects and related data that enable interaction of an operator with a terminal or dedicated HMI through one or more gestures such as motion, speech, or touch, and combinations thereof. At least one of the graphical data objects or gesture data objects can be part of one or more display objects included in operator interface(s) associated with control process(es) and associated equipment regulated through controller 250 or other controllers (not shown).

Additionally, in example system 200, processor(s) 262 in controller 250 can be configured to execute or can execute computer-executable code instructions stored in memory 266 to implement or provide at least part of the described functionality of controller 250. Such computer-executable code instructions can include program modules or software or firmware applications that implement specific tasks which can be accomplished, for example, through one or more of the methods described in the subject specification and that are associated, at least in part, with functionality or operation of example system 200. Moreover, in one or more embodiments, control platform or a portion thereof, and I/O interface(s) or a portion thereof, can be implemented as software or firmware that can be retained in memory 266 as one or more sets of computer-executable code instructions that, when executed by processor(s) 266, implement such functional elements and their associated functionality as described herein in various aspects. To provide such functionality, in one aspect, processor(s) 262 can exploit bus 271 to exchange data or any other information amongst functional elements within controller 250 and memory 266 or elements therein. Bus 271 can be embodied in at least one of a memory bus, a system bus, an address bus, a message bus, or any other conduit, protocol, or mechanism for data or information exchange among components that execute a process or are part of execution of a process. Bus 271 also can include a power bus. The exchanged information can include at least one of computer-executable code instruction(s), computer-executable code structure(s), data structures, or the like.

Figure 4:
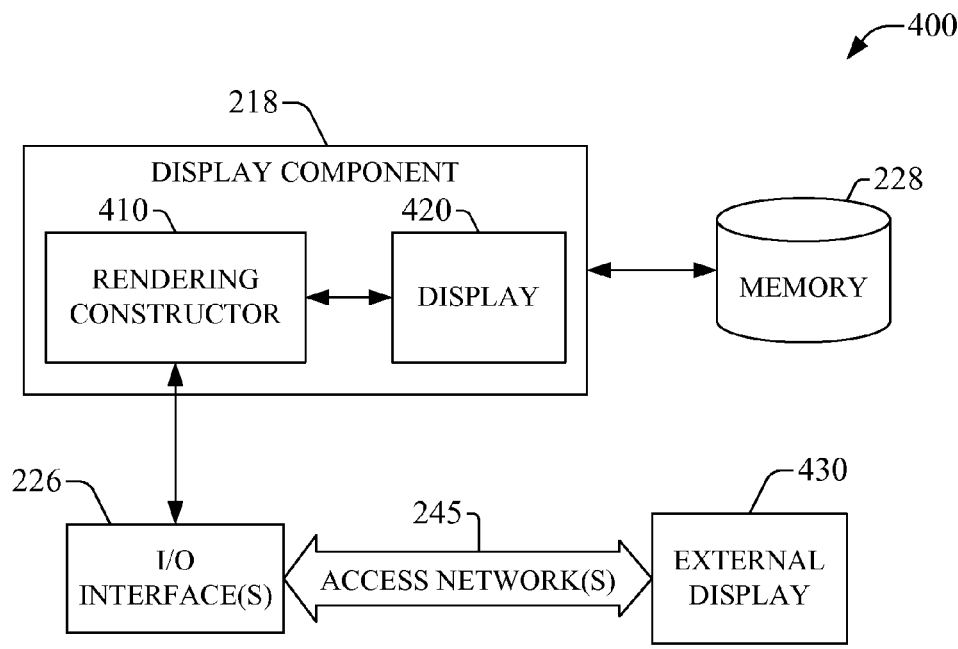
FIG. 4 illustrates an example embodiment of a display component that can be part of a rendering terminal in accordance with one or more aspects disclosed herein.

Functionality of a display component in accordance with aspects described herein can be enabled through various components. FIG. 4 illustrates an example embodiment 400 of a display component that can be part of a rendering terminal in accordance with one or more aspects disclosed herein. In the example embodiment 400, display component 218 includes a rendering constructor component 410, also referred to as rendering constructor 410 in the subject disclosure, and a display 420. Rendering constructor 410 can acquire (retrieve, receive, etc.) a collection of display objects based on control logic and related control data structure(s); as described supra, the collection of display objects can be generated automatically through a mapping between a set of display objects and a set of control data structures that are part of control code that represents the control logic. In an aspect, the control logic can be acquired from a controller (e.g., 250), from a device (e.g., 292) or from a design node (e.g., a server or computer; not shown in FIG. 2). Based on at least such collection, and thus based at least on the control logic, rendering constructor 410 can configure (e.g., compose and commit to a memory) a rendering project that, when executed by a component or a processor, renders an operator interface.

In an aspect, to configure a rendering project, rendering constructor 410 can generate a full rendering project based on acquired control logic. In addition or in the alternative, to configure a rendering project, rendering constructor 410 can modify an extant rendering project in response to change(s) in control logic. To modify an extant rendering project, rendering constructor 410 can merge the extant rendering project with one or more alternative rendering projects or portions thereof. In a scenario, rendering constructor 410 can merge a portion of a first rendering project (e.g., a newly created rendering project) with a second rendering project (e.g., the extant rendering project). In certain embodiments, to merge the portion of the first rendering project with the second rendering project, rendering constructor 410 can insert a first set of rendering instructions associated with the first rendering project into a second set of rendering instructions associated with the second rendering project. One or more of such sets of rendering instructions can include pre-specified rendering instruction(s) in addition to rendering instructions composed in response to acquired control logic. Pre-specified rendering instruction(s) can include rendering instructions that are predetermined as part of a graphics product (which can be hardware, software, or firmware) retained within a terminal that renders an operator interface associated with a rendering project. In the alternative, pre-specified rendering instruction(s) can be supplied as part of data received at such terminal; the data can be input by an end-user (human agent or machine-based intelligent agent). Utilization of pre-specified rendering instructions allows rendering constructor 410 to retain specific features of a display object based on one or more factors. At least one advantage of merging two or more rendering projects to configure a rendering project is that such merging enables preservation of one or more custom settings present in an extant rendering project prior to configuration of a related rendering project in response to acquired control logic.

In another aspect, to configure a rendering project, rendering constructor 410 can exploit the location of at least one instance of a control data structure (tag instance, instruction instance, etc.) within the control logic. In an aspect, the control logic can be partitioned into one or more logical blocks, such as a programming routine(s), program module(s), or the like. Location within the control logic can be a logical block of the one or more logical blocks within the control logic. As an example, the location of the control data structure can enable rendering constructor 410 to establish the position of a display object within a rendering project and related operator interface. As another example, the location of the control data structure within the control logic can enable rendering constructor 410 to provide navigation functionality within an operator interface; e.g., navigate from a first screen to second screen. Such navigation can include production of a pop-up window, emission of sound, rendition of data (e.g., temporal trend of a selected control variable, or the like). In another aspect, rendering constructor 410 can exploit metadata related to the control data structure and that defines location of the control structure within the control logic.

Rendering constructor 410 can execute the rendering project and thus render the associated operator interface via display 420, which includes circuitry that enables conveying an operator interface, the circuitry includes backlighting circuitry; pixel circuitry; sound rendering circuitry and associated functional elements such as speakers, microphones, or the like; etc. In an aspect, the display 420 can be embodied in a monitor such as a cathode ray tube (CRT) monitor, a Liquid Crystal Display (LCD) monitor, a plasma monitor, a light emitting diode (LED) monitor, an electrochromic monitor, or the like.

Rendering constructor 410 can modify a rendering project in response to data received from an end-user via a data entry component (e.g., a keypad, a touch screen; not shown) in an HMI that includes the rendering constructor 410, for example. In one or more embodiments, portion(s) of a rendering project automatically generated in response to changes in control logic in a controller (e.g., 250) can be available for modification: For instance, a portion of the rendering project can be configured as "temporary" or "tentative" and display object(s) related to the portion can be rendered in temporary or tentative locations in a display area; tentatively or temporarily rendered display object(s) can be vetted by a designer to determine a permanent location in the display area for the display object(s). Likewise, portion(s) of a rendering project can be configured as "perennial" or "right" and thus the rendering of display object(s) associated with such portion(s) is not submitted to vetting. In a scenario, rendering constructor 410 can execute a first rendering project and prompt an end-user to accept or modify the resulting operator interface rendered through display 420. In response to the prompt, rendering constructor 410 receives data that conveys either acceptance of the operator interface or a modification to the operator interface. For an accepted operator interface, rendering constructor 410 logically commits the rendering project, whereas for a modified operator interface, rendering constructor 410 alters the rendering project in accordance with the data that conveys the modification.

In addition, based at least on an acquired collection of display objects for a specific control logic, rendering constructor 410 can generate a plurality of rendering projects and select a particular rendering project to execute, and therefore a particular operator interface to render, based on factors extrinsic to the control logic. Selection can be dictated by an adequacy score evaluated from a function of at least such factors: rendering constructor can compute the adequacy score of the plurality of rendering projects and select a rendering project for which the adequacy score is above a predetermined threshold. The factor extrinsic to the control logic can include rendering resources of a terminal or device that can render the operator interface, e.g., display real estate of the device, display resolution of the device, or the like; security privilege of an operator who can consume control data through the operator interface.

Rendering constructor 410 also can supply an operator interface to an external display 430, which can be part of a device functionally coupled to terminal 210 through access network(s) 245. External display 430 can operate in substantially the same manner as display 420; however, specific rendering resources available to display 420 can be dictated by the device (e.g., a mobile device). Rendering constructor 410 can autonomously customize the operator interface rendered in the external display in accordance with aspects described below.

Figure 5:
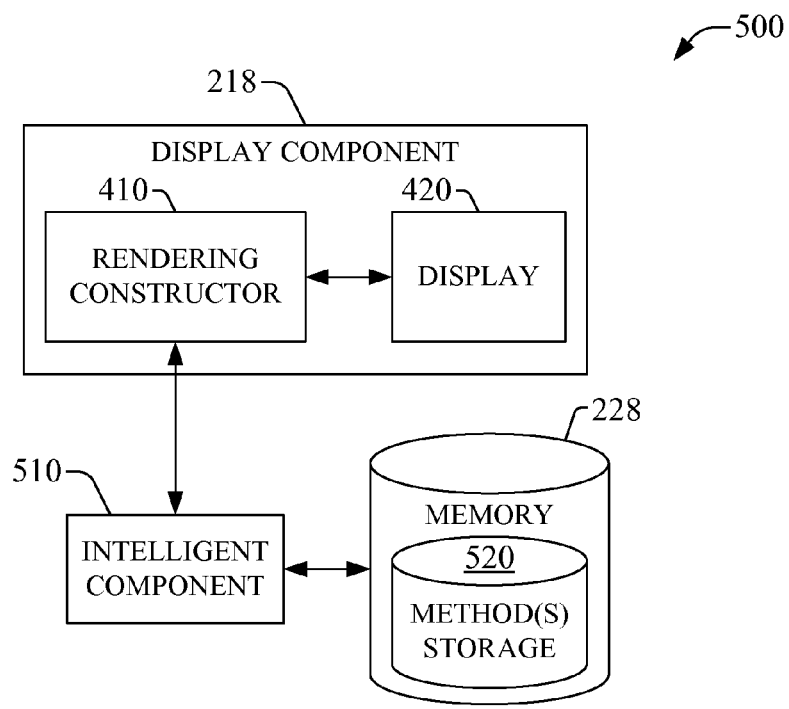
FIG. 5 presents an example system for automatic generation of an operator interface in accordance with aspects described herein.

FIG. 5 presents an example system 500 for automatic generation of an operator interface in accordance with aspects described herein. Rendering constructor 410 can exploit an intelligent component 510 to infer an operator interface in response to one or more changes to a control logic, e.g., a control project, retained in controller 250. As illustrated, intelligent component 510 can be external to display component 218; e.g., in can reside in device 292; however, in one or more embodiments, intelligent component 510 can reside within display component 218. In an aspect, intelligent component 510 can infer (e.g., autonomously identify) a set of elements (sensor(s), controller(s), equipment, etc.) in a control system that can be related to the one or more changes to the control code, and modify an extant operator interface to optimize or nearly optimize conveyance of control data associated with the updated control code. In another aspect, intelligent component 510 can infer placement of a display object in an operator interface based at least on learning from historical data on accepted operator interfaces and modified operator interfaces that include the display object; as described supra, acceptance of an operator interface is indicated by data received from an end-user that consumes control data through the operator interface.

To make an inference, e.g., to reason and draw a conclusion based on a set of metrics, formal arguments, or known mathematical outcomes in controlled scenarios, intelligent component 510 can exploit artificial intelligence (AI) techniques, which can be formalized in a methodology that is retained method(s) storage 520. Intelligent component 510 supplies an inference to rendering constructor component 410. Artificial intelligence techniques typically apply advanced mathematical algorithms or methods to a data set; such algorithms or methods are part of the methodology and can include decision trees, neural networks, regression analysis, principal component analysis (PCA) for feature and pattern extraction, cluster analysis, genetic algorithm, or reinforced learning. In particular, intelligent component 510, or one or more components therein, can employ at least one of numerous methods for learning from the data set and then drawing inferences from models formally represented by employed method. As an example, the numerous methods for learning can include Hidden Markov Models (HMMs) and related prototypical dependency models can be employed. General probabilistic graphical models, such as Dempster-Shafer networks and Bayesian networks like those created by structure search using a Bayesian model score or approximation can also be employed. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited by intelligent component 510.

In addition or in the alternative, for control logic, rendering constructor component 410 can exploit intelligent component 510 to infer a satisfactory (e.g., optimal or nearly optimal) operator interface based on factors extrinsic to the control logic, with such factors including those indicated supra. As an example, intelligent component 510 can identify a set of rendering resources available to a terminal (e.g., 210) or a device (e.g., a mobile device, a back-office computer) that can render control data, and can customize an operator interface based at least on one or more of the control logic and the set of rendering resources. Intelligent component 510 can exploit AI techniques to optimize or to achieve a satisfactory utility trade-off between cost of rendering the customized operator interface and the benefit of consuming control data through the customized operator interface. In an aspect, intelligent component 510 also can utilize various formalisms to automatically search for the satisfactory operator interface. A search can be driven at least by evaluation of a metric that assesses suitability of a candidate operator interface; if the metric fulfills at least one suitability criterion, then rendering constructor 410 can select the candidate operator interface as a satisfactory metric. The various formalisms can have disparate degrees of complexity and can include steepest descent algorithm, Monte Carlo simulations, Tabu search, or genetic algorithm. The various formalisms can be retained as a suitable methodology in method(s) storage 520.

Figure 6:
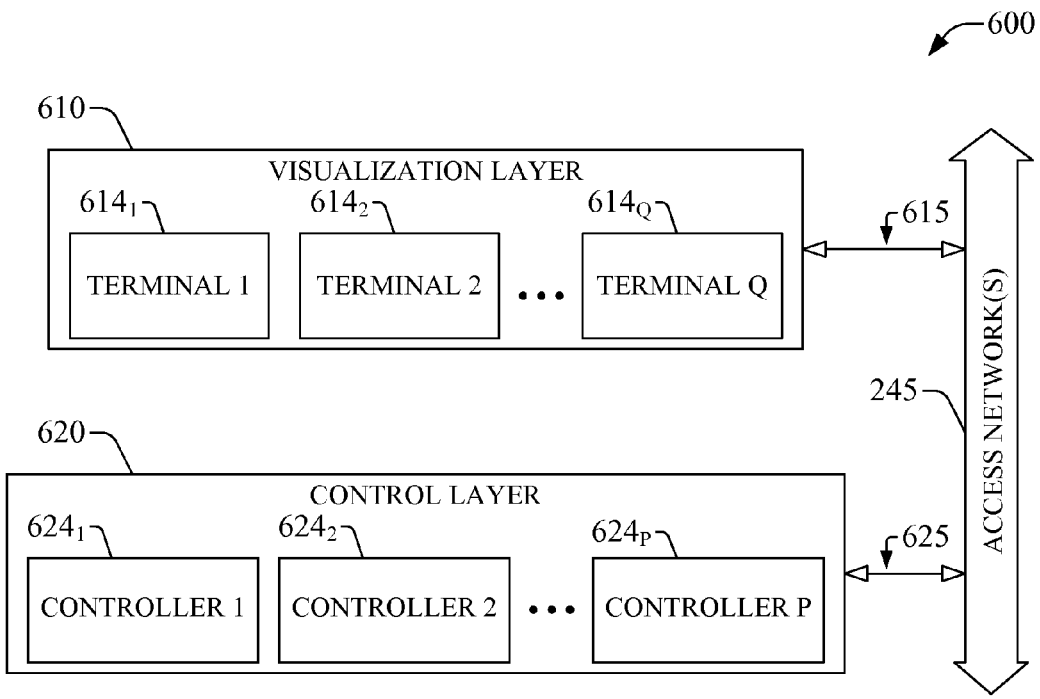
FIG. 6 is a block diagram of an example control system that can exploit automated generation of operator interface(s) in accordance with aspects described herein.

FIG. 6 is a block diagram of an example control system 600 that can exploit automated generation of operator interface(s) in accordance with aspects described herein. In the subject example control system, a visualization layer 610 and a control layer 620 are integrated. In an aspect, integration is accomplished in part through access network(s) 245 and specific interfaces that functionally couple each of the foregoing layers to such access network(s).

Visualization layer 610 includes a set of Q terminals $\mathbf{614}_1$-$\mathbf{614}_Q$, with Q a natural number greater than or equal to unity. Terminal $\mathbf{614}_\lambda$, with $\lambda=1, 2 \ldots Q$, renders control data and can operate in the same or substantially the same manner as terminal 210; terminal $\mathbf{614}_\lambda$, can be embodied in a dedicated HMI or in a computer, such as a desktop computer, a mobile computer, a smartphone, that can render control data. In an aspect, visualization layer 610 can be homogeneous and composed of networked workstations. In another aspect, visualization layer 610 can be heterogeneous, with terminals $\mathbf{614}_1$-$\mathbf{614}_Q$ comprising a group of desktop computers, a group of workstations, and a group of dedicated HMIs; where HMIs in the group can have disparate functionality and can include legacy HMIs. As indicated supra, visualization layer 610 and control layer 620 are functionally connected (e.g., communicatively coupled) through access network(s) 245. Control layer 620 includes P controllers $\mathbf{624}_1$-$\mathbf{624}_P$, with P a natural number greater than or equal to unity. Communication of information (data, signaling, etc) within each layer in control system 600 is accomplished through access network(s) 245 and interfaces 615 and 625.

In one or more embodiments, controllers $\mathbf{624}_1$-$\mathbf{624}_P$ can be industrial controllers or industrial automation controllers, as described supra. As described supra, each of the controllers $\mathbf{624}_1$-$\mathbf{624}_P$ includes processor(s) (not shown), volatile and non-volatile memory (not shown), and other circuitry (not shown) that enables implementation of control process(es) (e.g., execution of control logic, or control code instructions) related to a specific control environment (e.g., 110; not shown in FIG. 6). Linkage amongst controllers $\mathbf{624}_1$-$\mathbf{624}_P$ and terminals $\mathbf{614}_1$-$\mathbf{614}_Q$ can be a one one-to-many relationship or a one-to-one relationship. Terminals $\mathbf{614}_1$-$\mathbf{614}_Q$ and controllers $\mathbf{624}_1$-$\mathbf{624}_P$ can be distributed in disparate geographic locations. Accordingly, disparate functional elements of access network(s) 245 enable communication, and related exchange of data or information, amongst two or more terminals located in disparate geographic regions. In addition, such functional elements of access network(s) 245 can enable communication, and related exchange of data or information, amongst two or more controllers that reside in disparate geographical locations.

In an aspect, for communication purposes, and related exchange of data, each layer operates as a single logical unit. Thus, communication amongst disparate layers is carried out in the same or substantially the same manner irrespective of geographical location of the functional elements (e.g., terminal 2 $\mathbf{614}_2$ and controller P $\mathbf{624}_P$) that exchange data. In addition, a management component in a local terminal (e.g., $\mathbf{614}_1$) can access data available in the local terminal in the same or substantially the same manner as data available in a remote terminal (e.g., $\mathbf{614}_Q$). Similarly, data available in one or more controllers in control layer 620 appears logically the same to local terminal(s) and remote terminal(s) within visualization layer 610. While each layer in example control system 600 operates as a single logical unit for data exchange purposes, each layer can include one or more elements associated with disparate control environments and thus disparate portions of a single logical unit can operate under disparate requirement(s) or specification(s).

In additional or alternative embodiments, a device layer (not shown) comprising at least R devices also can be deployed (e.g., installed, configured, tested, and accepted) and functionally coupled (e.g., communicatively coupled) to visualization layer 610. Here, R is natural number greater or equal than unity. At least one device in the device layer (not shown) can include a set of one or more data structures that can be employed in substantially the same manner as control data structure(s) 270 to produce (e.g., create or modify) at least one operator interface automatically. One or more terminals in visualization layer 610 can produce (create or modify) the at least one operator interface.

In certain embodiments, visualization layer 610 or control layer 620 can include a device that can perform control functions (e.g., execute control logic) and render control data through graphical data objects in an operator interface. As an example, such device can be a terminal of the set of terminals $\mathbf{614}_1$-$\mathbf{614}_Q$, wherein the terminal has been embedded (e.g., programmed) with control functionality that can be enabled by a processor within the terminal. As another example, such device can be a controller of the set of controllers $\mathbf{624}_1$-$\mathbf{624}_P$, which has been embedded (e.g., programmed) with graphical data rendering functionality that can be enabled by a processor within the controller; the graphical rendering functionality can include rendering of control data to an external display (e.g., 430) functionally coupled to the controller.

Figure 7:
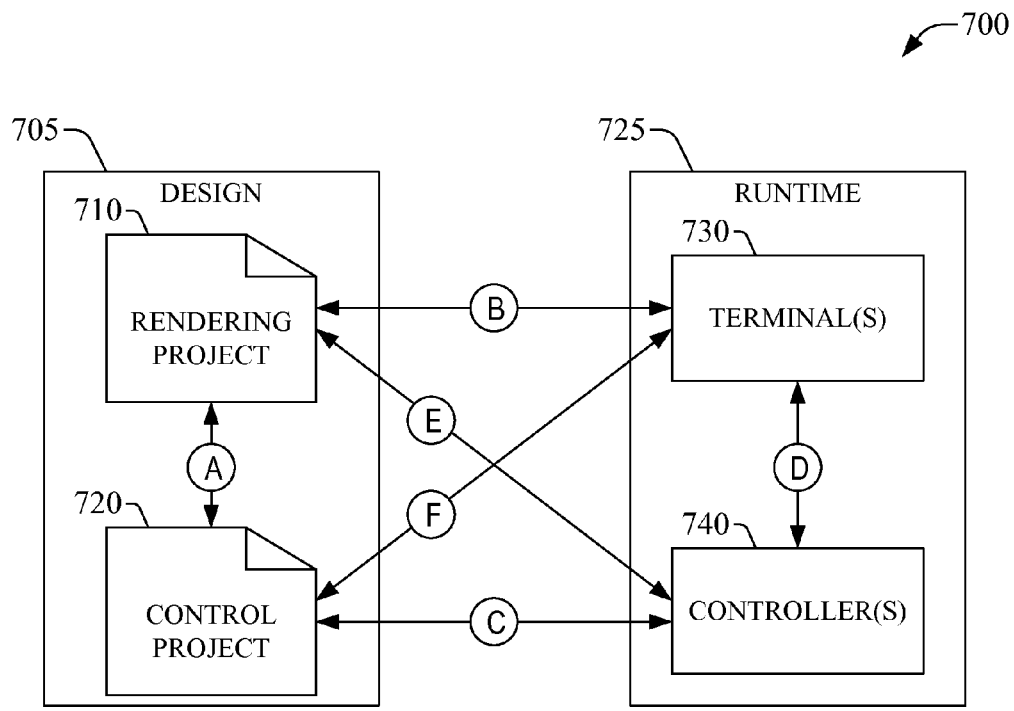
FIG. 7 is a diagram that illustrates various functional couplings amongst design environment and runtime environment that are enabled through features or aspects described herein.

FIG. 7 is a diagram 700 that illustrates various functional couplings amongst design environment and runtime environment that are enabled through features or aspects described herein. Rendering project 710 and control project 720 are functionally connected through coupling "A", which can be enabled by one or more servers, one or more controllers, or one or more terminals in the design environment 705. It should be appreciated that coupling "A" is also available in conventional control systems. In contrast to conventional control systems, however, a server that allows development of rendering project 710 can dynamically access (e.g., retrieve, extract, receive) control logic in a control project 720; for instance, the server executes a rendering design package, which can be embodied in one or more sets of code instructions, and receives the control logic via an acquisition component. Based on the control logic, the server can exploit a mapping to automatically update rendering project 710; the updated instance of rendering project 710 can be refined by the server through received data or autonomously. It should be appreciated that the subject innovation enables generating an updated rendering project by inserting content into an extant rendering project rather than by creating a full rendering project and then establishing the so created rendering project as the updated rendering project. In an aspect, inserting content includes merging a new set of rendering instructions into an extant set of rendering instructions in the extant rendering project. It is thus appreciated that the aspects or features described herein can reduce development of the rendering project 710.

Couplings "B" and "C" functionally connect the design environment 705 and the runtime environment 725. Through coupling "B", the rendering project 710 can be loaded, or installed, in one or more terminal(s) 730, which can render control data generated at least in part in controller(s) 740. In addition or in the alternative, through coupling "B", a rendering project, or a portion thereof, or other data can be collected from terminal(s) 730 and loaded into design environment 705. Likewise, through coupling "C", the control project 720 can be loaded, or installed, in one or more controller(s) 740 to execute control in runtime environment 725. In addition or in the alternative, through coupling "C", a control project, or a portion thereof, or other data can be collected from controller(s) 740 and loaded into design environment 705. As discussed supra, the rendering project 710 installed in the one or more terminal(s) 730 is designed to render control data generated in accordance with the control project 720; the one or more terminal(s) 730 render the control data through an operator interface originated in the rendering project 710. As part of coupling "D", the one or more controller(s) 740 supply the one or more terminal(s) 730 control data. In addition, in contrast to conventional runtime environments, the one or more terminal(s) 730 can (i) collect or receive control logic (e.g., a plurality of control data structures) from the one or more controller(s) 740 in the runtime environment 725, and (ii) automatically update the operator interface based on the control logic. It should be noted that such automatic update can be effected within the runtime environment 725 in response to a change in the control logic in at least one of the one or more controller(s) 740. An updated operator interface can be refined through external data received by the one or more terminal(s). Accordingly, visualization development costs (e.g., time, related wages . . . ) of a rendering interface can be reduced with respect to conventional control systems.

In one or more embodiments, design environment 705 and runtime environment 725 can be functionally coupled during runtime, or dynamically. Coupling "E" allows a terminal in the design environment 705 to collect real-time (or latest known) control data to develop a suitable rendering project 710. At least one advantage of developing the rendering project 710 is that various rendering features (conveyance of alarms, presentation of trends, availability of navigation tools, etc.) can be evaluated with actual control data. Coupling "F" enables control logic in the control project 720 in the design environment 705 to be collected by the one or more terminal(s) 730 in the runtime environment 725, and be represented therein as an operator interface. Therefore, a plurality of potential changes to control logic can be evaluated in the runtime environment 725 with minimal or without down time for the one or more terminal(s) 730 and without reconfiguration of the control logic in the one or more controller(s) 740.

As described supra, based on the couplings "A"-"F" enabled by one or more embodiments of the subject disclosure, a bottom-up environment for development of control environment and visualization environment is provided. Control project 720 can be developed separately from rendering project 710, and such projects can be harmonized, or integrated, through the couplings "A"-"F" in response to the control project 720 or implementation thereof at runtime. Accordingly, the various embodiments disclosed herein allow the design environment 705 and the runtime environment 725 to remain isolated, while affording various levels of integration that enable automated visualization development or design.

It is noted that in certain embodiments, the various couplings described supra amongst design environment 705 and runtime environment 725 also can be implemented amongst a device (not shown) in runtime environment 725 and rendering project 710 or control project 720. The device at runtime also can be coupled to terminal(s) 730 or controller(s) 740.

Figure 8:
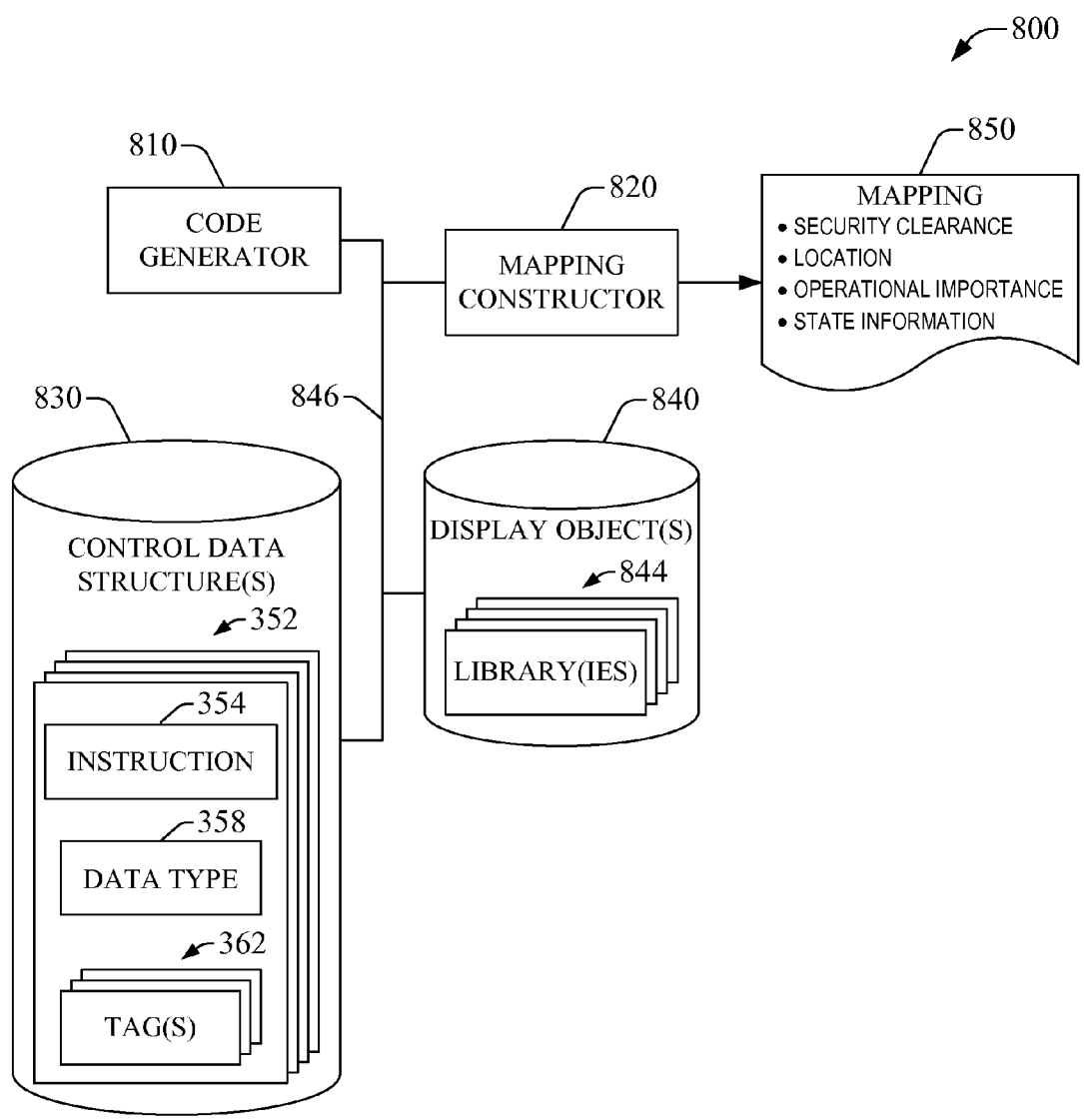
FIG. 8 is an example system for generation of control data structures and display objects in accordance with aspects described herein.

FIG. 8 is an example system 800 for generation of control data structures and display objects in accordance with aspects described herein. Code generator component 810, also referred to as code generator 810, enables composition of a control project and related control data structure(s). Code generator 810 can receive data (not shown) that defines a specific control project (not shown), for a particular control process; the control project includes one or more control data structures. Code generator 810 also can receive data that defines a control data structure, which can be retained in control data structure(s) storage 830. As described supra, a control data structure comprises instruction(s) 834, data type(s) 838, and metadata tag(s) 842. In addition, code generator 810 can enable creation of a library of display objects. To at least that end, code generator 810 can receive data that includes a specific display object in a library. As described hereinbefore, code generator 810 can retain a set of library(ies) 844 in display object(s) store 840 or in a dedicated memory element, as indicated supra.

Mapping constructor component 820, also referred to as mapping constructor 820, generates a mapping 850 amongst a display object and a control data structure. The mapping 850 can associate a set of control data structures with a set of display objects through a one-to-one relationship, a one-to-many relationship, or a many-to-many relationship. As described supra, the control data structure can be defined by at least one of a control instruction, a data type, and a memory tag, and the mapping 850 can associate a display object to one or more parts of the control data structure. Mapping 850 can be supplied as a stand-alone object or can be linked to a library of display objects. As an example, mapping 850 can be supplied to a terminal, such as terminal 210, and retained in mapping(s) storage 232 within memory 228. As another example, the library can include a logical connection between a control data structure, or a portion thereof, and a display object; thus, the library can define the mapping.

Mapping 850 is specific to a control domain (e.g., manufacturing, packaging, testing) or markets (food and beverage, pharmaceutical, vehicular, oil and gas, electric, telecommunications, etc.). In addition, Mapping 850 can be included as part of an HMI design or an HMI runtime product; the mapping can be defined by the HMI vendor or by an end-user (control designer, operator, etc.). In an aspect, the mapping 850 can be based at least in part on at least one or more of a security clearance, a location of a terminal or HMI that exploits the mapping, operational importance, state information (e.g., alarm conditions), or location of an instance of control data structure (e.g., a tag instance or an instruction instance) within a control project. For each of the latter factors related to mapping 850, mapping 850 establishes a relationship amongst a specific set of display objects and a specific set of control data structures. For example, different security clearance levels can result in disparate operator interfaces for specific control logic; higher security clearance level can be provided richer, more functional operator interfaces. As described hereinbefore, the relationship can be a one-to-one relationship, a one-to-many relationship, or a many-to-many relationship. Thus, the mapping 850 can be structured to include different associations amongst a control data structure and a display object.

Code generator 810 and mapping constructor 820 can exchange data via bus 846, which also enables code generator 810 and mapping constructor 820 to retrieve and store data in control data structure(s) storage 830 and display object(s) store 840. Bus 846 can allow external data to be conveyed to code generator 810 and mapping constructor 820.

Figure 9:
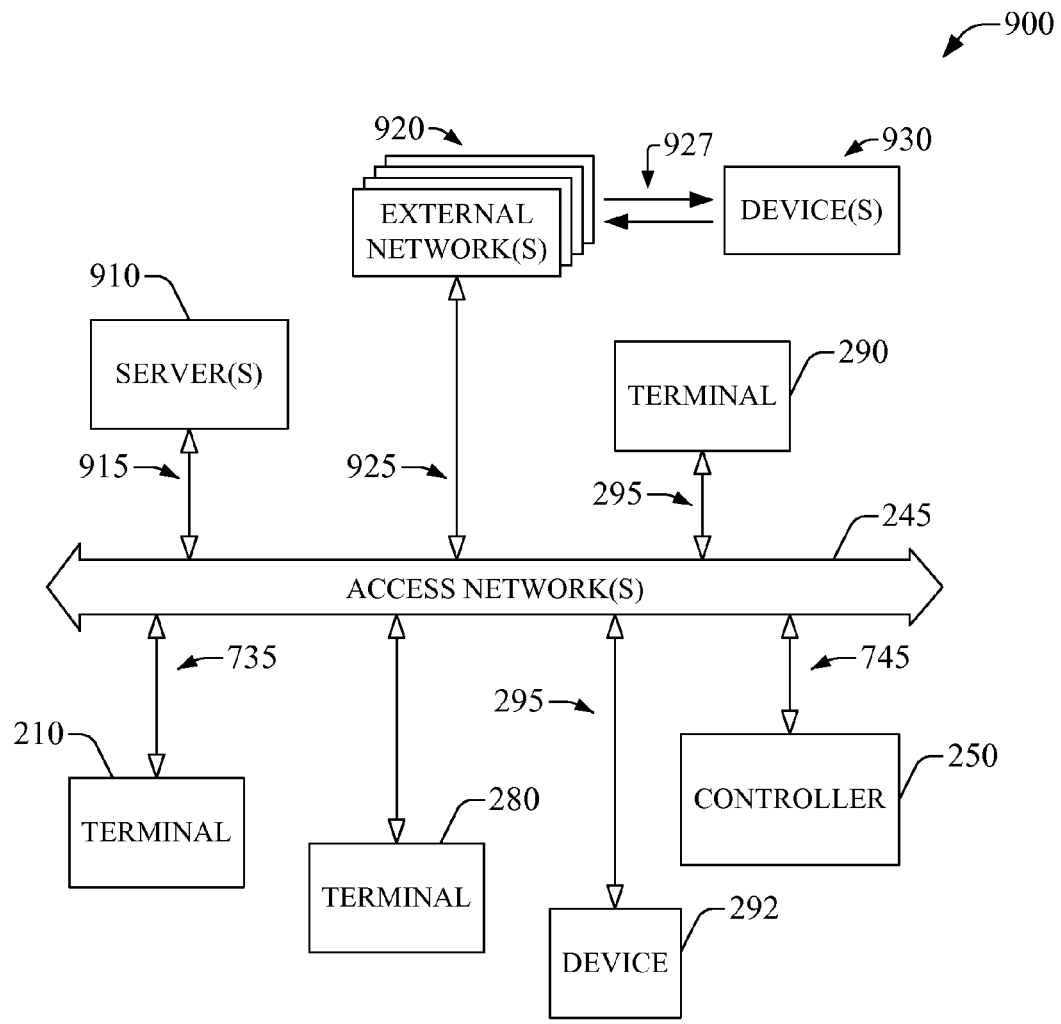
FIG. 9 represents an example control system that enables utilization of automated generation of operator interface(s) in an integrated environment in accordance with aspects described herein.

FIG. 9 represents an example control system 900 that enables utilization of automated generation of operator interface(s) in an integrated environment in accordance with aspects described herein. In the subject example control system, terminal(s) (e.g., 210, 280, and 290) in a visualization layer and controller(s) (e.g., 250) in a control layer are functionally coupled to server(s) 910 and external network(s) 920 through access network(s) 245. While not shown, one or more of the access nodes, such as workstation(s), desktop computer(s), mobile computer(s), data management station(s) also can be part of example control system 900. Interface(s) 915 and 925 enable communication amongst server(s) 910 and access network(s) 245, and external network(s) 920 and access network(s) 245, respectively. The various interface(s) in example integrated control system 900 can include one or more network nodes (e.g., server(s), router(s) . . . ) that provide a plurality of services, including security services (firewall deployment, data encapsulation, authorization and access services, etc.). External network(s) 920 which can operate as service network(s) and can include enterprise network(s) such as business management network(s), customer support network(s), or vendor network(s). External network(s) 920 enable communication of functional elements in visualization layer and control layer with device(s) 930, mobile or otherwise; device(s) 930 are functionally coupled to external network(s) 920 via communication link(s) 927, which include wired link(s) or wireless link(s).

Server(s) 910 can be part of a design environment in control layer or a design environment in a rendering layer. Server 910 can configure at least one controller (e.g., controller 250) to regulate control process(es) associated with equipment (e.g., 140). In an aspect, server(s) 910 can generate and supply control project(s) to controller 250 to configure control features. Server 910 can retain data resource(s) associated with configured control process(es) and controller(s) (e.g., control 250). As part of a design environment in a visualization layer, server(s) 910 can enable generation of a rendering project, which configure one or more terminals (e.g., terminal 210) to render control data in accordance with control process(es) and related controller(s) that regulate equipment. The rendering project is based in part on a control project and can be generated automatically according to aspects described herein.

In an aspect of example control system 900, a remote device within device(s) 930 can configure one or more of a controller (e.g., 250) or a terminal (e.g., 210) through server 910. In contrast to, and as advantage with respect of, conventional operation of HMIs in typical control environment, terminal(s) in example control system 900 can access and be accessed by the remote device, which can be an enterprise device (a back-end computer, a workstation, a printer, etc.). Terminal(s) or controller(s) in example control system 900 can acquire (receive, retrieve, etc.) data and signaling from server(s) 910 and device(s) 930.

Figure 10:
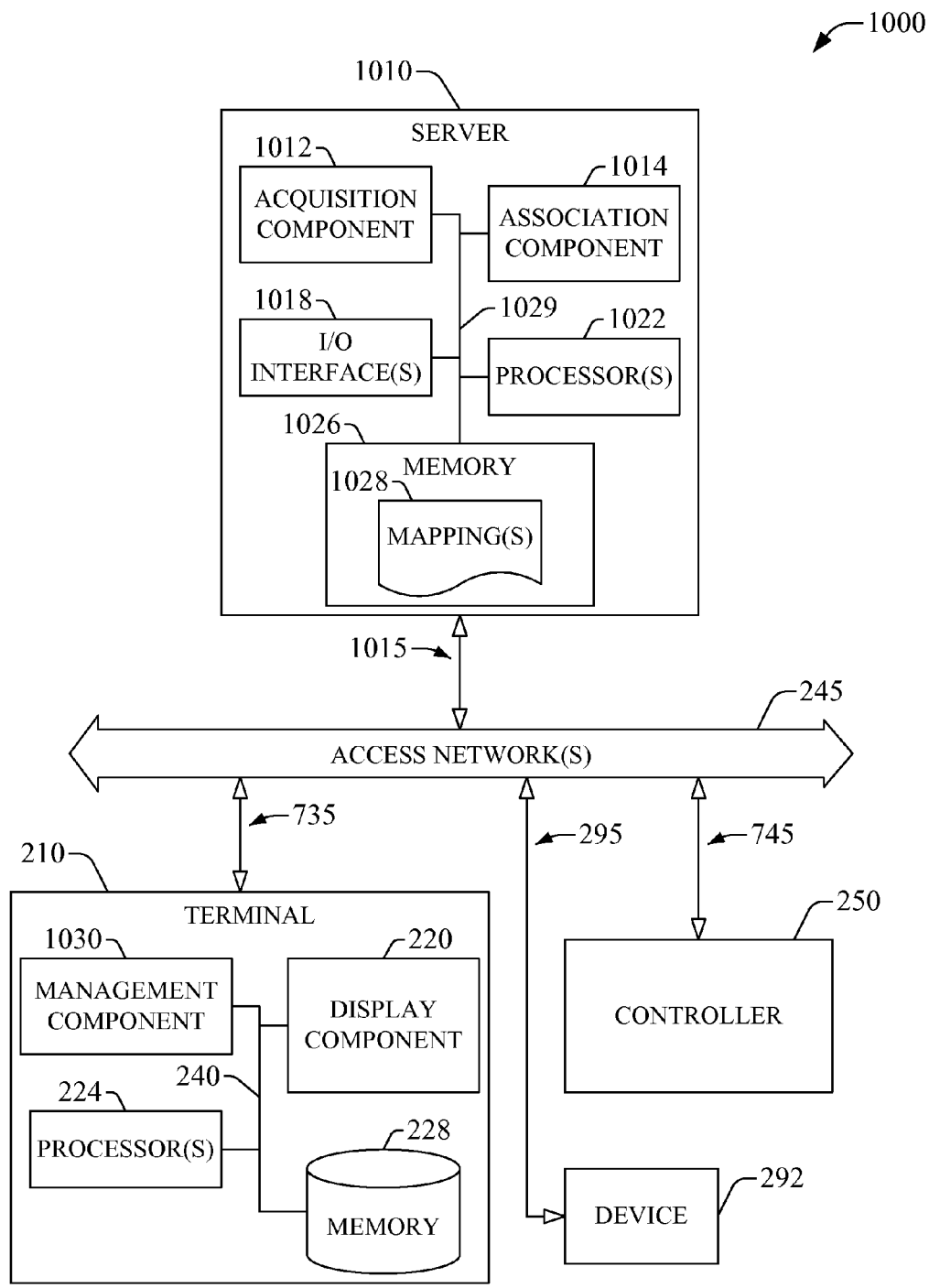
FIG. 10 illustrates an example system that enables centralized automated generation of operator interface(s) in a control system in accordance with aspects described herein.

FIG. 10 illustrates an example system 1000 that enables centralized automated generation of operator interface(s) in a control system in accordance with aspects described herein. In the subject example system, server 1010 includes an acquisition component 1012 and an association component 1014. Acquisition component 1012 can operate in substantially the same manner as acquisition component 212. In an aspect, acquisition component 1012 can extract control logic (e.g., automation control logic) from in controller 250 via access network(s) 245. In addition or in the alternative, acquisition component 1012 also can extract one or more data structures from device 292 via interface(s) 295. The control logic can be retained in memory 1026. Association component 1014 can access (e.g., retrieve or receive) the control logic and exploit a mapping to associate one or more instances of a control data structure, or a portion thereof, to a display object (text-based display object, graphical display object, aural display object, etc.). The mapping can be retained in memory element 1028. Based at least on the association, server 1010 can deliver a rendering project (not shown) to terminal 210. In the illustrated embodiment, management component 1030 in terminal 210 can receive the rendering project (not shown) and can store it in memory 228. Display component 1040 can execute the rendering project and therefore render an operator interface, which is based on the control logic in controller 250. Display component 1040 can operate in substantially the same manner as display component 218.

In example system 1000, automated generation of a rendering project based at least on control logic is accomplished in server 1010 and thus such automated generation does not consume computational resources of terminal 210. As described supra, the control logic can be collected from a control project in a design environment, or from a controller (e.g., 250) in a runtime environment. Accordingly, automated generation of an operator interface at a server can be advantageously exploited in control systems that include legacy terminal(s) for rendering control data associated with controlled equipment and related process(es), since the legacy terminal(s) may lack the computational resource(s) to automatically generate the operator interface.

In certain embodiments, server 1010 can be part of a network that is external to access network(s) 245; see, e.g., FIG. 9. In an illustrative scenario, a supplier of terminal 210 can operate server 1010 and provide automated generation of an operator interface based on control logic as a service to a party that utilizes terminal 210 within a control system. In such scenario, a network node (not shown) that is part of access network(s) 245 can ensure that server 1010 securely access controller 250 and terminal 210.

In server 1010, processor(s) 1022 can be configured to execute or can execute computer-executable code instructions (not shown) stored in memory 1026 to implement or provide at least part of the described functionality of server 1010, which can embody one or more servers disclosed herein. Such computer-executable code instructions can include program modules, or software or firmware applications that implement specific tasks which can be accomplished, for example, through one or more of the methods described in the subject specification and that are associated, at least in part, with functionality or operation of example control system 1000. Moreover, in some embodiments, the various components of server 1010 can be implemented as software or firmware applications that can reside in memory 1026 as one or more sets of computer-executable code instructions that, when executed by processor(s) 1022, implement such various components and the functionality thereof as described herein in various aspects. I/O interfaces 1018 can enable exchange of information, e.g., data resources, and can be part of interface(s) 1015.

In an aspect, to provide at least part of functionality of server 1010, processor(s) 1022 can exploit bus 1029 to exchange data or any other information amongst functional elements (e.g., components) within server 1010 and memory 1026 or elements therein. Bus 1029 can be embodied in at least one of a memory bus, a system bus, an address bus, a message bus, or any other conduit, protocol, or mechanism for data or information exchange among components that execute a process or are part of execution of a process. Bus 1029 also can include a power bus. The exchanged information can include at least one of computer-executable code instructions, code structure(s), data structures, or the like.

In view of the example systems described above, example methods that can be implemented in accordance with the disclosed subject matter can be better appreciated with reference to flowcharts in FIGS. 11-15. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Figure 11:
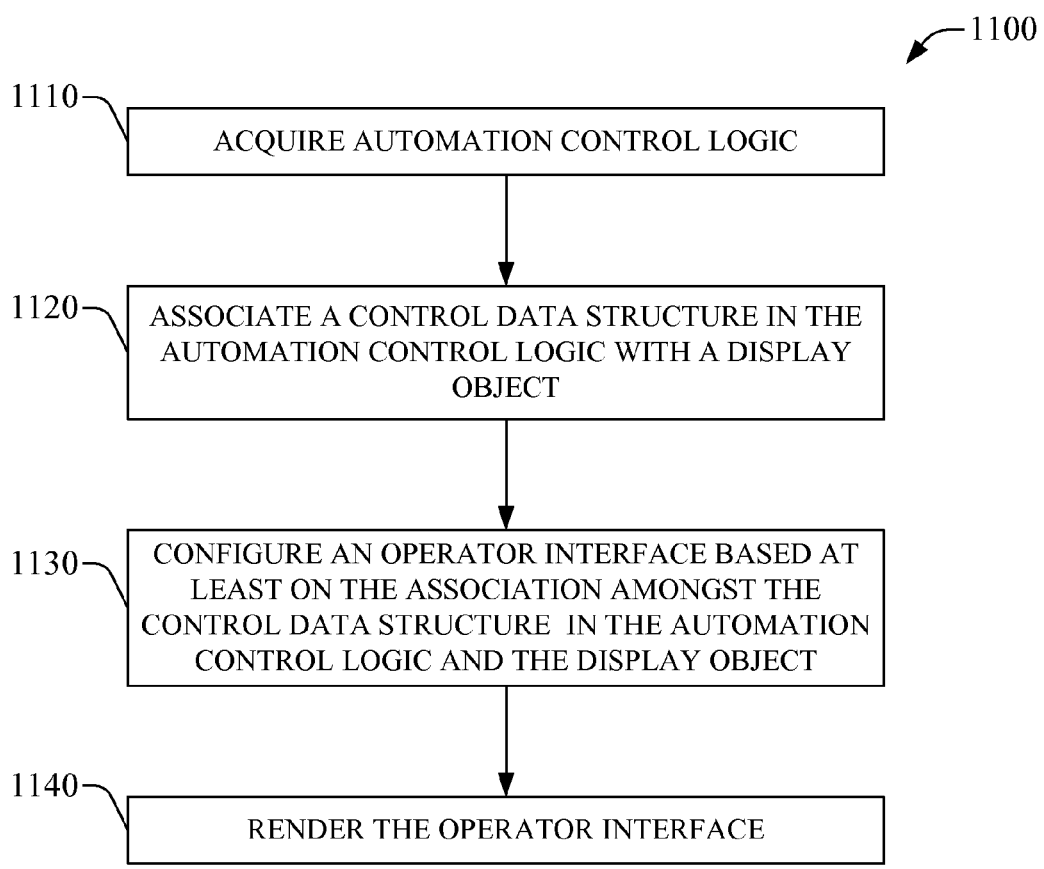
FIG. 11 presents an example method for generating an operator interface automatically in a control system according to aspects of the subject disclosure.

FIG. 11 is a flowchart of an example method 1100 for generating an operator interface automatically in a control system according to aspects of the subject disclosure. While illustrated with automation control logic, it is noted that the subject example method 1100 can exploit other control logic (e.g., a measurement protocol in one or more experiments, navigation instructions in an unmanned vehicle). Additionally or alternatively, in certain embodiments, the subject example method 1100 can be implemented for data structure(s) that define, in part, I/O modules within the automation control logic. The example method 1100 can be implemented (e.g., executed) by a terminal (e.g., 210) that renders control data. In an aspect, one or more processors configured to provide or that provide the functionality of the one or more terminals can implement the subject example method. At act 1110, automation control logic is acquired (received, retrieved, etc.). The automation control logic can be acquired at runtime from a controller (e.g., controller 250) or at design time from a server or design platform. At act 1120, a control data structure in the automation control logic is associated with a display object, e.g., a graphical object or an aural object. As described supra, a control data structure comprises a control instruction, a data type, and a metadata tag. In an aspect, as disclosed before, the associating includes extracting the control data structure in the automation control logic and, for the control data structure, acquiring the display object based at least on a mapping that links a set of display objects to a set of control data structures. In addition, the associating can include binding the display object to a rendering project (e.g., an extant rendering project) that defines the operator interface to convey control data dictated at least by the control data structure.

At act 1130, an operator interface is configured based at least on the association amongst the control data structure in the automation control logic and the display object. The configuring is automatic. Configuring the operator interface can include generating a full rendering project that, in response to execution by a component or a processor, renders the operator interface. In addition or in the alternative, configuring the operator interface can include merging a portion of a first rendering project (e.g., a newly created rendering project) with a second rendering project (e.g., an extant rendering project). In an aspect, the merging includes inserting a first set of rendering instructions associated with the first rendering project into a second set of rendering instructions associated with the second rendering project. The merging described herein enables preservation of one or more custom settings present in one or more of the first rendering project or the second rendering project. Accordingly, the operator interface that is configured through the merging can maintain at least one custom setting created prior to the merging.

At act 1140, the operator interface is rendered. As indicated supra, rendering the operator interface includes executing a rendering project that defines the operator interface.

It is noted that the subject example method 1100, or at least a portion thereof, can implemented without reliance on automation control logic as a source of control data structure(s). As described supra, control data structure(s) can be acquired from a device that does not include automation control logic.

Figure 12A:
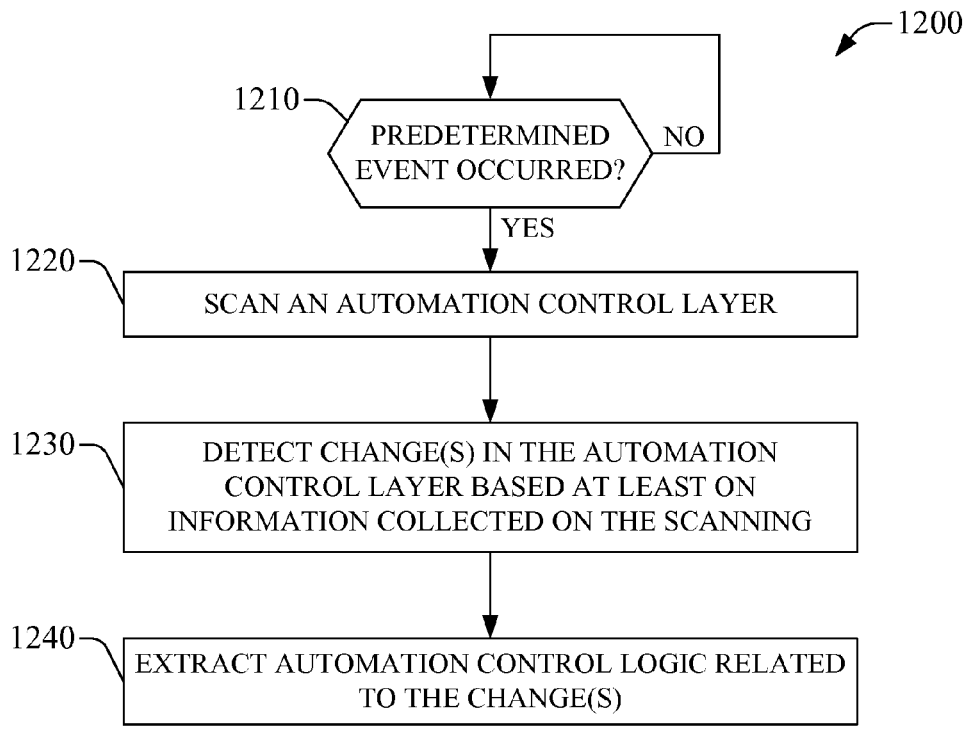
FIGS. 12A-12B present example methods for acquiring control logic in accordance with aspects of the subject disclosure.
Figure 12B:
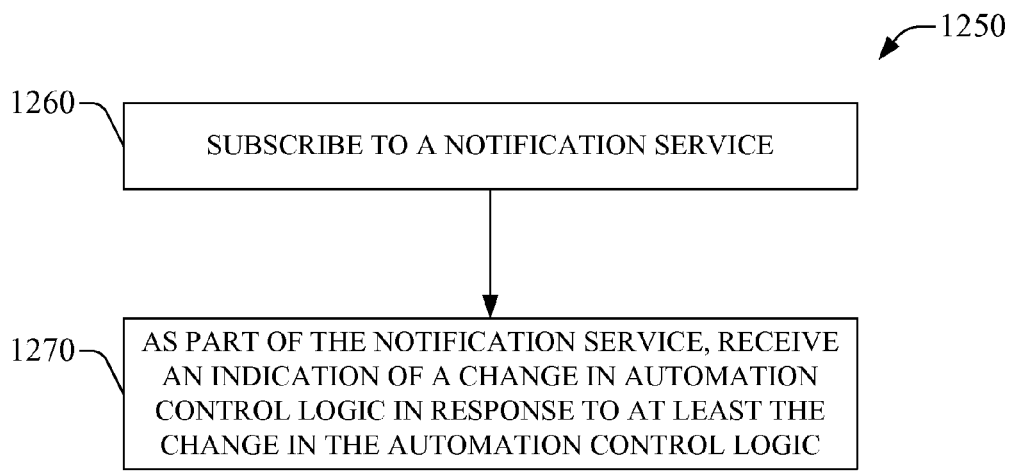

FIGS. 12A-12B present flowcharts of example methods 1200 and 1250, respectively, for acquiring control logic in accordance with aspects of the subject disclosure. The subject example methods are illustrated with automation control logic; however, other control logic can be acquired according to such example methods. In addition, the subject example methods 1200 and 1250 can embody act 1110 of example method 1100. The functional element that implements at least act 1110 can perform example methods 1200 and 1250. In an embodiment, the terminal that performs example method 1100 also can enact the subject example method. In another embodiment, a server (e.g., 910) or one or more components therein can conduct example method 1200 or example method 1250; or one or more processors configured to provide or that provide the functionality of the server or the one or more components therein can conduct at least one of the acts of example method 1200 or example method 1250. Regarding example method 1200, at act 1210, it is determined if a predetermined event occurred. A predetermined event includes a change event in control logic, a control system startup event, a request event for probing the control system for changes in control logic, or a combination thereof. In the affirmative case, flow is directed to act 1220, whereas in the negative case act 1210 is re-enacted. At act 1220, an automation control layer is scanned. The scanning includes collecting one or more of (i) state condition(s) of equipment regulated via at least part of the control layer; (ii) state condition(s) of device(s) in the control layer or equipment associated thereto; or (iii) automation control logic in the control layer. At act 1230, change(s) in the automation control layer are detected based at least on information collected through the scanning at act 1220. Detecting the change(s) can be accomplished in various manners. For instance, detecting the change(s) can include comparing collected automation control logic in the control layer with automation control logic extant in the automation control layer prior to occurrence of the predetermined event. At act 1240, automation control logic related to the change(s) is extracted.

Regarding example method 1250, at act 1260, a notification service is subscribed to; at least one apparatus that retains automation control logic, and associated control data structures, can provide the notification service. The functional element that performs at least part of example method 1100 can subscribe to the notification service. At act 1270, as part of the notification service, an indication of a change in the automation control logic is received from the at least one apparatus in response to at least the change in the automation control logic. In an aspect, receiving the indication can include collecting payload data conveyed by the indication and decoding such payload data. As indicated supra, a change in the automation control logic can include one or more of addition of a control data structure related to the automation control logic, removal of a control data structure related to the control logic, or modification of a control data structure related to the control logic. In an embodiment, the at least one apparatus is at least one controller (e.g., 250). In another embodiment, the at least one apparatus is at least one device (e.g., 292).

Figure 13:
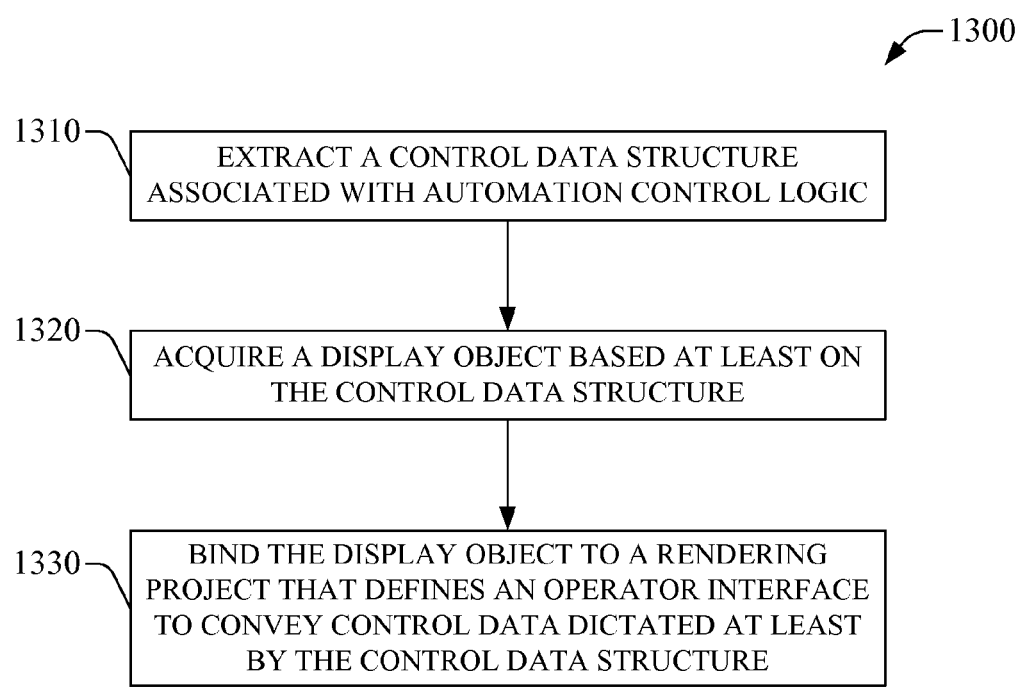
FIG. 13 illustrates an example method for associating automation control logic to a display object according to aspects of the subject disclosure.

FIG. 13 illustrates an example method 1300 for associating automation control logic to a display object according to aspects of the subject disclosure. The subject example method also can be implemented for control logic other than automation control logic. In an embodiment, the terminal (e.g., 210) that performs example method 1100 also can enact the subject example method. In another embodiment, a server (e.g., 910) or one or more components therein can conduct the subject example method 1300; or one or more processors configured to provide or that provide the functionality of the server or the one or more components therein can conduct at least one of the acts of the subject example method 1300. At act 1310, a control data structure associated with automation control logic is extracted. At act 1320, a display object based at least on the control data structure is acquired. At act 1330, the display object is bound to a rendering project that defines an operator interface that conveys control data dictated at least by the control data structure. The operator interface can convey the control data when executed by a display component (e.g., 218) or a processor functionally coupled thereto. As described supra, the display object can be one of an icon, a faceplate, a control screen, animated display indicia, aural indicia, or the like.

Figure 14:
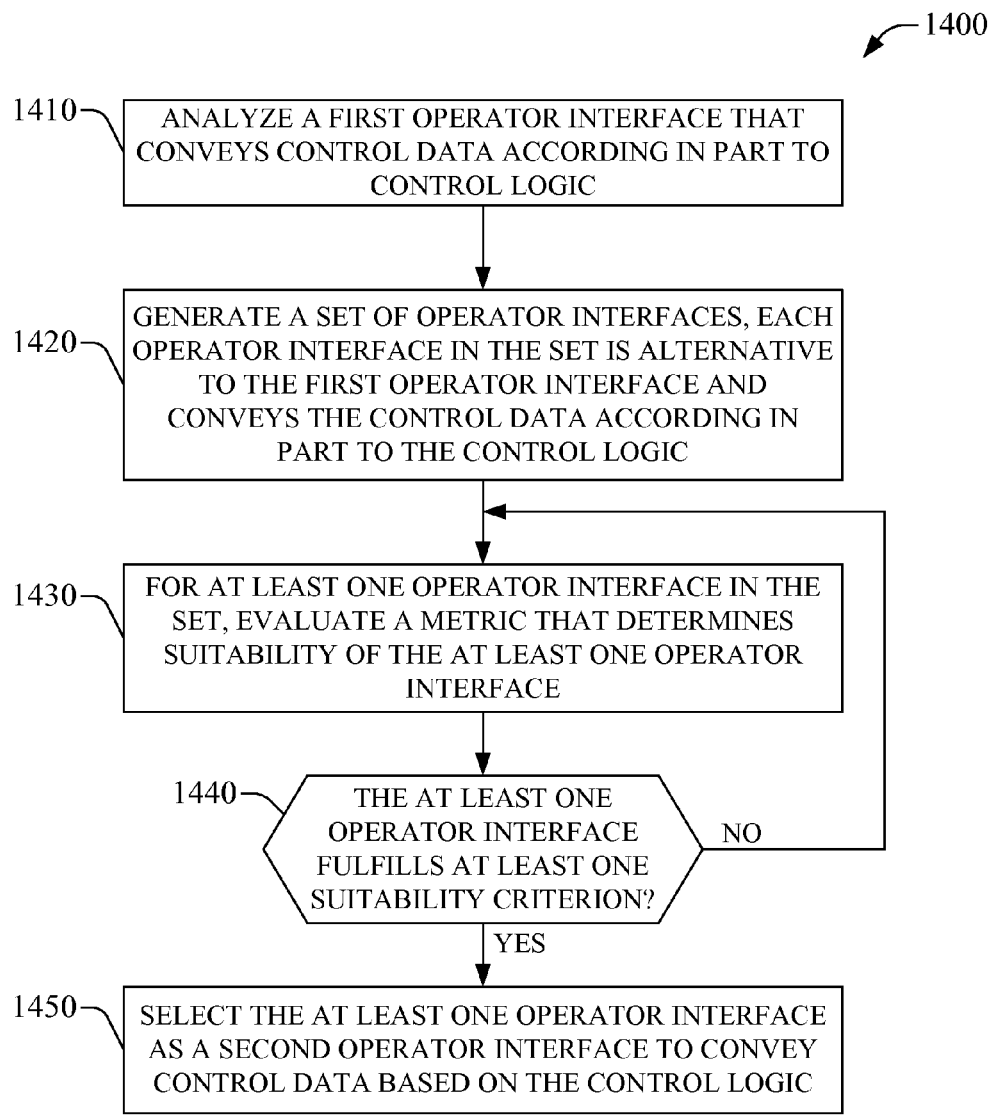
FIGS. 14-15 present example methods for configuring an operator interface automatically in a control system according to aspects described herein.

FIG. 14 is a flowchart of an example method 1400 for configuring an operator interface automatically in a control system according to aspects described herein. The subject example method also can be implemented for control logic other than automation control logic. In addition, the subject example method can embody, at least in part, act 1130 of example method 1100. In an embodiment, the terminal (e.g., 210) that performs example method 1100 also can enact the subject example method. In another embodiment, a server (e.g., 910) or one or more components therein can conduct the subject example method 1400; or one or more processors configured to provide or that provide the functionality of the server or the one or more components therein can conduct at least one of the acts of the subject example method 1400. At act 1410 a first operator interface is analyzed. The first operator interface conveys control data (e.g., automation control data) according to control logic (e.g., automation control logic). At act 1420, a set of operator interfaces is generated, each operator interface in the set is alternative to the first operator interface and conveys control data according the control logic (e.g., automation control logic). Compared to the first operator interface, alternative features of each operator interface in the set include one or more of (1) richer indicia to convey control data, e.g., display objects with higher resolution, display objects that enable manipulation of the conveyed control data, or the like; (2) simplified indicia to convey control data, such as display objects with low graphical resolution or text-based display object; (3) alternative arrangement of display objects rendered through the first operator interface, such as a scaled view of a screen and related graphic objects that fits available display real estate available to the terminal that renders the screen; etc. In one or more embodiments, the terminal that enacts example method 1100, or a component that is part of such terminal, can provide one or more features (1)-(3) and the like. For instance, a rendering constructor component (e.g., 410) that can be part of such terminal can exploit scalable vector graphics technology to provide feature (3), inter alia.

At act 1430, for at least one operator interface in the set of operator interfaces, a metric that determines suitability of the at least one operator interface is computed. The metric can be a function of at least one of the control logic (e.g., automation control logic) and factors extrinsic to the control logic, as described hereinbefore. At act 1440, it is probed if the at least one operator interface fulfills at least one suitability criterion. In the negative case, flow is directed to act 1430, whereas in the affirmative case, at act 1450, the at least one operator interface is selected as a second operator interface that conveys control data according to the control logic (e.g., automation control logic).

Figure 15:
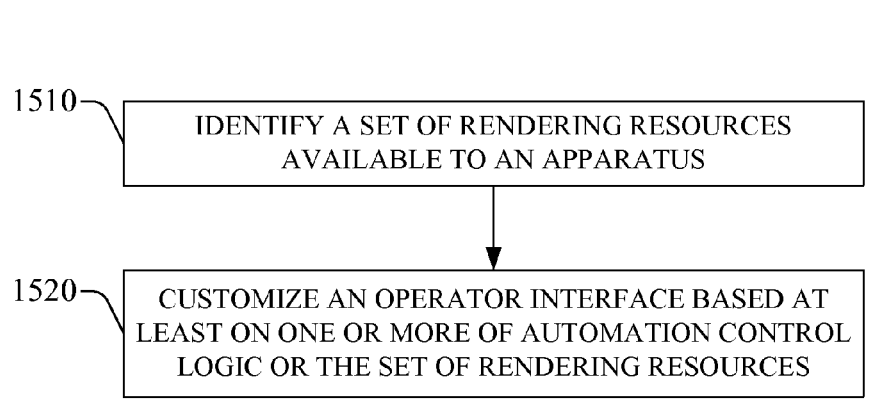

FIG. 15 is a flowchart of an example method 1500 for configuring an operator interface automatically in a control system according to aspects described herein. In addition, the subject example method can embody act 1130 of example method 1100. In an embodiment, the terminal (e.g., 210) that performs example method 1100 also can enact the subject example method. In another embodiment, a server (e.g., 910) or one or more components therein can implement the subject example method; one or more processors configured to provide or that provide the functionality of the server can conduct at least one of the acts of the subject example method 1200. At act 1510, a set of rendering resources available to an apparatus are identified. The apparatus can be a terminal (e.g., 210) or a device that can render control data produced in the control system according to control logic, such as automation control logic. At act 1520, an operator interface is customized based at least on one or more of the automation control logic or the set of rendering resources.

Method(s) disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 16:
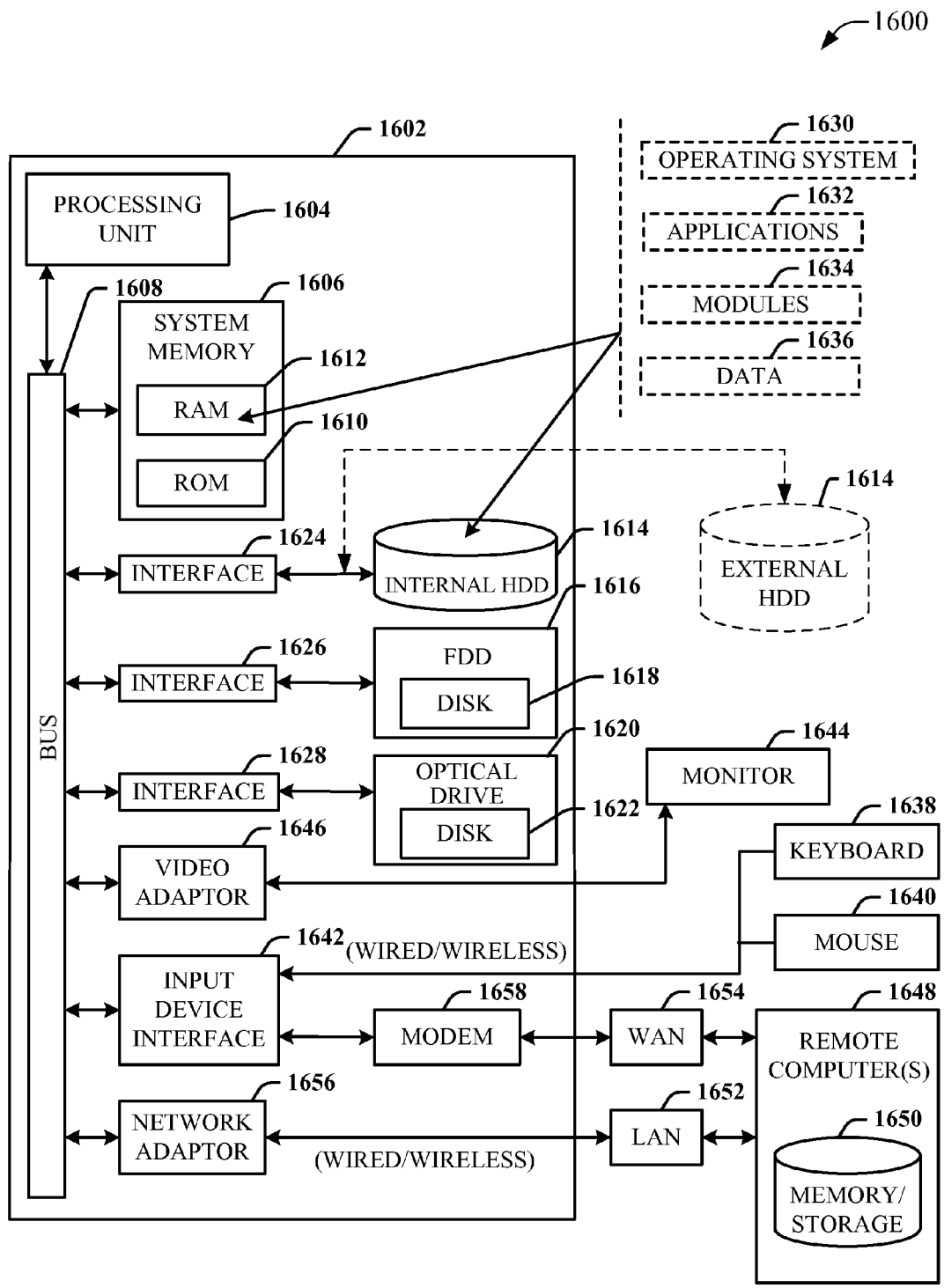
FIG. 16 illustrates a block diagram of a computer operable to execute the disclosed architecture.

Referring now to FIG. 16, there is illustrated a block diagram of a computer operable to execute the disclosed architecture. In order to provide additional context for various aspects thereof, FIG. 16 and the following discussion are intended to provide a brief, general description of a suitable computing environment 1600 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

A computer and computing devices in general typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various aspects includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Interface 1624 enables functional coupling of computer 1602 to a removable memory, such as a USB memory device or a SD memory card. Other external drive connection technologies are within contemplation of the subject innovation.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed innovation.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the innovation can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are illustrative and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
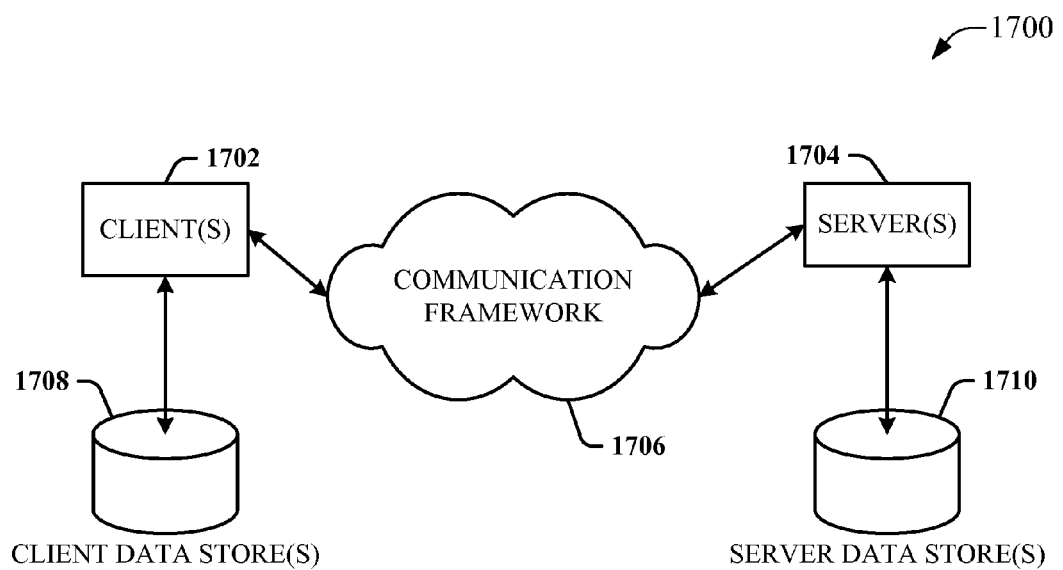
FIG. 17 illustrates a schematic block diagram of an example computing environment.

Referring now to FIG. 17, there is illustrated a schematic block diagram of an example computing environment 1700 in accordance with another aspect. The system 1700 includes one or more client(s) 1702. The client(s) 1702 can be hardware and/or software (e.g., threads, processes, computing devices). The client(s) 1702 can house cookie(s) and/or associated contextual information by employing the subject innovation, for example.

The system 1700 also includes one or more server(s) 1704. The server(s) 1704 can also be hardware and/or software (e.g., threads, processes, computing devices). The servers 1704 can house threads to perform transformations by employing the invention, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) or associated contextual information). Similarly, the server(s) 1704 are operatively connected to one or more server data store(s) 1710 that can be employed to store information local to the servers 1704.

In the subject specification and annexed drawings, terms such as "repository," "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps or acts of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   at least one processor configured to execute computer-executable components retained in at least one memory, the computer-executable components comprising:
      a display component configured to display a human-machine interface that renders data retrieved from an industrial controller;
      an acquisition component configured to read a control instruction defined in an industrial control program executing on the industrial controller and to determine a location of the control instruction within the industrial control program;
      an association component configured to select a display object, from a set of display objects, based on mapping definition information that defines respective mappings between a set of control instructions, including the control instruction, and the set of display objects, wherein the mapping definition information defines an association between a type of the control instruction and the display object based on the location of the control instruction within the industrial control program; and
      a rendering constructor component configured to add the display object to the human-machine interface in response to the control instruction being read by the acquisition component based at least on the mapping definition information, wherein the human-machine interface renders control data associated with the control instruction via the display object.

2. The device of claim 1, wherein the acquisition component is further configured to read a data structure comprising definition information that defines an input/output (I/O) module of the industrial controller, and the association component is further configured to select another display object from the set of display objects based on the mapping definition information, wherein the mapping definition information defines additional mappings between a set of data structures, including the data structure, and the set of display objects.

3. The device of claim 1, wherein the mapping definition information defines the mappings to be specific to at least one of a control domain, a security clearance, a location of the device, or state information of equipment controlled in part by the industrial control program.

4. The device of claim 1, wherein at least one mapping of the mappings comprises a one-to-one relationship, a one-to-many relationship, a many-to-one relationship, or a many-to-many relationship.

5. The device of claim 1, wherein the acquisition component is further configured to read the control instruction in response to detection of a modification to the industrial control program during a runtime mode of the industrial controller.

6. The device of claim 1, wherein the acquisition component is further configured to read the control instruction from a control project in a design environment.

7. The device of claim 1, wherein the rendering constructor component is further configured to retain the display object in the human-machine interface in response to first input data that represents acceptance of the display object or delete the display object in response to second input data that represents rejection of the display object.

8. The device of claim 1, wherein the rendering constructor component is further configured to deliver the human-machine interface to an external display that operates in an apparatus communicatively coupled to the device, a peer device, or a legacy terminal that renders the control data.

9. The device of claim 1, wherein the rendering constructor component is further configured to select a placement of the display object in the human-machine interface based at least on learning from historical data relating to at least one of previously accepted human-machine interfaces or previously modified human-machine interfaces that include the display object.

10. A method, comprising:
rendering, by a system including a processor, data read from an industrial controller on a human-machine interface;
detecting a control instruction comprising a portion of a control program executing on the industrial controller;
determining a location of the control instruction within the control program;
identifying a defined association between the control instruction and a display object as a function of the location based on mapping information that defines respective associations between a plurality of control instructions and a plurality of display objects, wherein the mapping information defines the respective associations as a function of location within the control program;
generating an instance of the display object on the human-machine interface based at least on the defined association; and
rendering control data associated with the control instruction via the display object.

11. The method of claim 10, further comprising:
detecting, in the control program, a control data structure comprising at least one of a data type or a metadata tag; and
identifying a another defined association between the control data structure and a another object based on the mapping information, wherein the mapping information further defines respective associations between a plurality of control data structures, including the control data structure, and the plurality of display objects.

12. The method of claim 10, wherein the detecting comprises:
scanning an automation control layer in response to a determination that a defined event has occurred;
determining that the automation control layer has changed based at least on information collected by the scanning; and
reading a portion of the control program in response to the determining.

13. The method of claim 12, wherein the defined event comprises at least one of a change in the control program, a control system startup event, or a request for scanning the automation control layer.

14. The method of claim 13, wherein the detecting comprises:
subscribing to a notification service provided by at least one apparatus that retains the control program; and
receiving, based on the notification service, an indication from the at least one apparatus in response to a determination that the control program has changed.

15. The method of claim 10, further comprising binding the instance of the display object to a rendering project that defines the human-machine interface.

16. The method of claim 10, further comprising merging a portion of a first rendering project with a second rendering project to yield the human-machine interface.

17. The method of claim 16, wherein the merging comprises combining a first set of rendering instructions associated with the first rendering project with a second set of rendering instructions associated with the second rendering project.

18. The method of claim 10, further comprising:
generating a set of human-machine interfaces configured to convey control data generated by the control program; and
selecting at least one human-machine interface, of the set of human-machine interfaces, as the human-machine interface in response to a determination that the at least one human-machine interface satisfies at least one suitability criterion.

19. A computer-readable storage medium having stored thereon computer-readable instructions that, in response to execution, cause a system comprising at least one processor to perform operations, the operations comprising:
displaying a human machine-interface that renders data retrieved from an industrial controller;
identifying a control instruction defined in an industrial control program that executes on the industrial controller;
determining a location of the control instruction within the industrial control program;
determining an association between the control instruction, the location, and a display object based on mapping information that defines respective linkages between a set of control instructions, including the control instruction, and a set of display objects, including the display object, as a function of location within the industrial control program; and
rendering the display object on the human-machine interface based at least on the association and displaying control data associated with the control instruction via the display object.

20. The computer-readable storage medium of claim 19, wherein the operations further comprise:
acquiring the control program at control runtime from the industrial controller in response to a determination that the control instruction has been added to the industrial control program.

21. The device of claim 1, wherein the rendering constructor component is further configured to, in response to the control instruction being read by the acquisition component, create a communicative link between the display object and the control instruction and control a state of the display object based on the control data read from the control instruction.

22. The method of claim 10, further comprising communicatively linking the instance of the display object to the control instruction in response to the detecting.

23. The device of claim 1, wherein the mapping definition information defines the respective mappings to be a function of at least one of a control domain or a market to which the industrial control program relates.

24. The device of claim 1, wherein the association component is configured to select the display object based in part on a subroutine of the industrial control program from which the control instruction is read.

25. The device of claim 1, wherein the location comprises at least one of a logical block within the industrial control program, a subroutine of the industrial control program, or a program module within the industrial control program.

* * * * *